US009807602B2

(12) United States Patent
Cherian et al.

(10) Patent No.: US 9,807,602 B2
(45) Date of Patent: Oct. 31, 2017

(54) APPARATUS AND METHOD FOR CONNECTION ESTABLISHMENT IN A COMMUNICATIONS NETWORK

(75) Inventors: George Cherian, San DIego, CA (US);
Peerapol Tinnakornsrisuphap, San Diego, CA (US); Jun Wang, La Jolla, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 603 days.

(21) Appl. No.: 13/080,522

(22) Filed: Apr. 5, 2011

(65) Prior Publication Data

US 2011/0249636 A1 Oct. 13, 2011

Related U.S. Application Data

(60) Provisional application No. 61/321,798, filed on Apr. 7, 2010.

(51) Int. Cl.
*H04W 8/26* (2009.01)
*H04L 29/12* (2006.01)
(Continued)

(52) U.S. Cl.
CPC ......... *H04W 8/26* (2013.01); *H04L 29/12801* (2013.01); *H04L 29/12915* (2013.01);
(Continued)

(58) Field of Classification Search
CPC ............. H04L 65/1069; H04L 65/1073; H04L 47/825; H04L 47/72; H04L 47/70
(Continued)

(56) References Cited

U.S. PATENT DOCUMENTS 6,374,112 B1    4/2002  Widegren et al.
7,447,175 B2 *  11/2008 Shin .............................. 370/331
(Continued)

FOREIGN PATENT DOCUMENTS

GB    2424547 A    9/2006
JP    2003110498 A    4/2003
(Continued)

OTHER PUBLICATIONS

International Search Report and Written Opinion—PCT/US2011/031635, International Search Authority—European Patent Office dated Aug. 17, 2011.
(Continued)

*Primary Examiner* — Redentor Pasia
(74) *Attorney, Agent, or Firm* — Arent Fox, LLP

(57) ABSTRACT

An apparatus and method for establishing a connection including reserving a common connection for use by more than one access terminal (AT); associating the common connection with a network identifier corresponding to the AT; deleting a network identifier-related context while maintaining the network identifier; and transmitting a message, based on a call to the AT, via the common connection and based on the network identifier, wherein a specific connection for carrying the call is based on a response to the message. In one example, the apparatus and method include conducting a registration session with a wireless communications network; obtaining a network identifier corresponding to the AT based on the registration session; deleting a network identifier-related context for the AT while maintaining the network identifier; receiving a message indicating a call destined for the AT; and establishing, based on the message, a specific connection for carrying the call.

22 Claims, 19 Drawing Sheets

(51) Int. Cl.
| | |
|---|---|
| *H04W 28/06* | (2009.01) |
| *H04W 76/02* | (2009.01) |
| *H04W 4/00* | (2009.01) |
| *H04W 60/00* | (2009.01) |
| *H04W 4/12* | (2009.01) |
| *H04W 28/26* | (2009.01) |

(52) U.S. Cl.
CPC ...... H04L 61/6004 (2013.01); H04L 61/6059 (2013.01); *H04L 29/12028* (2013.01); *H04L 29/12226* (2013.01); *H04L 29/12367* (2013.01); *H04L 61/103* (2013.01); *H04L 61/2015* (2013.01); *H04L 61/2514* (2013.01); *H04W 4/005* (2013.01); *H04W 4/12* (2013.01); *H04W 28/26* (2013.01); *H04W 60/00* (2013.01); *H04W 76/02* (2013.01)

(58) Field of Classification Search
USPC ........ 370/248, 252, 278, 282, 356, 474, 475
See application file for complete search history.

(56) References Cited

U.S. PATENT DOCUMENTS

| | | | |
|---|---|---|---|
| 7,539,160 B2 | 5/2009 | Virtanen et al. | |
| 7,613,811 B1 | 11/2009 | Bhalla et al. | |
| 2002/0196749 A1* | 12/2002 | Eyuboglu et al. | 370/328 |
| 2003/0012217 A1 | 1/2003 | Andersson et al. | |
| 2003/0073449 A1 | 4/2003 | Motegi et al. | |
| 2003/0236074 A1 | 12/2003 | Ishii et al. | |
| 2005/0073969 A1* | 4/2005 | Hart et al. | 370/318 |
| 2005/0174984 A1* | 8/2005 | O'Neill | 370/349 |
| 2005/0176422 A1* | 8/2005 | Choi et al. | 455/426.2 |
| 2006/0056440 A1 | 3/2006 | Khartabil | |
| 2007/0086339 A1 | 4/2007 | Briggs | |
| 2007/0109990 A1 | 5/2007 | Bennett | |
| 2007/0110034 A1 | 5/2007 | Bennett | |
| 2008/0082642 A1* | 4/2008 | Wu | 709/222 |
| 2009/0073933 A1* | 3/2009 | Madour | H04W 8/26 370/331 |
| 2009/0129296 A1* | 5/2009 | Grinshpun et al. | 370/261 |
| 2009/0168788 A1* | 7/2009 | Den | H04L 29/12367 370/401 |
| 2010/0022216 A1 | 1/2010 | Bandera et al. | |
| 2010/0157963 A1* | 6/2010 | Choi | H04L 12/4633 370/338 |
| 2011/0194510 A1 | 8/2011 | Gaal et al. | |
| 2011/0295956 A1 | 12/2011 | Pechanec et al. | |
| 2013/0308560 A1 | 11/2013 | Cherian et al. | |

FOREIGN PATENT DOCUMENTS

| | | | |
|---|---|---|---|
| JP | 2003283525 | A | 10/2003 |
| JP | 2006279899 | A | 10/2006 |
| WO | 02104046 | A1 | 12/2002 |
| WO | 03019973 | A2 | 3/2003 |
| WO | 2004077707 | A2 | 9/2004 |
| WO | 2006055933 | A2 | 5/2006 |
| WO | 2007080549 | A1 | 7/2007 |
| WO | 2009078508 | A1 | 6/2009 |
| WO | 2011047589 | A1 | 4/2011 |
| WO | 2011145602 | A1 | 11/2011 |

OTHER PUBLICATIONS

Qualcomm Incorporated; Cherian, George; 1-50 Wang, Jun; Tinnakornsrisuphap, Peerapol: 3GPP2 Network Optimization for M2M, Dec. 6, 2010 (Dec. 6, 2010), XP002650341.

3GPP TSG-RAN Meeting #22, "25.922 Rel-5 CR, Radio Resource handling of streaming traffic class PDP contexts," TSG-RAN WG2, RP-030627, Maui, USA, Dec. 9-12, 2003, pp. 1-5.

ITRI: "Resource sharing solution for MTC Groups", 3GPP Draft; S2-103106, 3rd Generation Partnership Project (3GPP), Mobile Competence Centre; 650, Route Des Lucioles; F-06921 Sophia-Antipolis Cedex; France, vol. SA WG2, No. Elbonia; Jul. 6, 2010, Jun. 29, 2010 (Jun. 29, 2010), XP050458194.

Kddi., et al., "MTC Small Data Transmissions", 3GPP Draft; S1-112400, 3rd Generation Partnership Project (3GPP), Mobile Competence Centre ; 650, Route Des Lucioles; F-06921 Sophia-Antipolis Cedex; France, vol. SA WG1, No. Dublin; Aug. 8, 2011, Aug. 15, 2011 (Aug. 15, 2011), XP050547880.

Mediatek Inc: "MTC small data identification mechanism for non-SMS Small Data Transmission Solution", 3GPP Draft; S2-114341_MTC_Small_Data_IDENTIFICATION, 3rd Generation Partnership Project (3GPP), Mobile Competence Centre; 650, Route Des Lucioles; F-06921 Sophia-Antipolis Cedex; France, vol. SA WG2, No. Jeju Island; Oct. 10, 2011, Oct. 4, 2011 (Oct. 4, 2011), XP050549516.

Samsung: "MTC Group Based Policing", 3GPP Draft; S2-100558-Grouppolicy, 3rd Generation Partnership Project (3GPP), Mobile Competence Centre; 650, Route Des Lucioles; F-06921 Sophia-Antipolis Cedex; France, vol. SA WG2, No. Shenzhen, China; Jan. 18, 2010-Jan. 22, 2010, Jan. 12, 2010 (Jan. 12, 2010), pp. 1-2, XP050630508.

ZTE: "The group bearer for MTC", 3GPP Draft; S2-100094_Group Bearer, 3rd Generation Partnership Project, Mobile Competence Centre; 650, Route Des Lucioles ; F-06921 Sophia-Antipolis Cedex; France, vol. SA WG2, No. Shenzhen; Jan. 18, 2010, Jan. 12, 2010 (Jan. 12, 2010), pp. 1-2, XP050432722.

ZTE: "The group bearer for MTC", 3GPP TSG SA WG2 Meeting #178, Feb. 22-26, 2010, TD S2-100995, sections 2. 5.1.3.X, 2 pages.

* cited by examiner

APPARATUS AND METHOD FOR CONNECTION ESTABLISHMENT IN A COMMUNICATIONS NETWORK

CLAIM OF PRIORITY UNDER 35 U.S.C. §119

The present application for patent claims priority to Provisional Application No. 61/321,798 entitled "Apparatus and Methods of Connection Establishment in a Communications Network" filed Apr. 7, 2010, and assigned to the assignee hereof and hereby expressly incorporated by reference herein.

FIELD

This disclosure relates generally to apparatus and methods for wireless communications. More particularly, the disclosure relates to connection establishment in a communications network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of another telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Disclosed is an apparatus and method for establishing a connection. According to one aspect, a method for establishing a connection in a wireless communications network including reserving a common connection for use by more than one access terminal (AT); associating the common connection with a network identifier corresponding to the AT (for example, with an IP address or an Universal Resource Locator (URL)); deleting a network-identifier context (for example, deleting an Internet Protocol (IP)-related context) for the AT while maintaining the network identifier; and transmitting a message, based on a call to the AT, via the common connection and based on the network identifier (whose context was deleted). In one example, a specific connection and a context for the network-identifier corresponding to the AT for carrying the call is based on a response to the message.

According to another aspect, a method for establishing a connection in an access terminal (AT) including conducting a registration session with a wireless communications network; obtaining a network identifier corresponding to the AT based on the registration session; deleting a network identifier-related context (e.g., an Internet Protocol (IP)-related context) for the AT while maintaining the network identifier; receiving a message indicating a call destined for the AT; and establishing, based on the message, a specific connection corresponding to the AT for carrying the call.

According to another aspect, an apparatus for establishing a connection comprising a processor and a memory, the memory containing program code executable by the processor for performing the following: reserving a common connection for use by more than one access terminal (AT); associating the common connection with a network identifier corresponding to the AT; deleting a network identifier-related context (e.g., an Internet Protocol (IP)-related context) for the AT while maintaining the network identifier; and transmitting a message, based on a call to the AT, via the common connection and based on the network identifier. In one example, a specific connection and a context for the network-identifier corresponding to the AT for carrying the call is based on a response to the message.

According to another aspect, an apparatus for establishing a connection comprising a processor and a memory, the memory containing program code executable by the processor for performing the following: conducting a registration session with a wireless communications network; obtaining a network identifier corresponding to an access terminal (AT) based on the registration session; deleting a network identifier-related context (e.g., an Internet Protocol (IP)-related context) for the AT while maintaining the network identifier; receiving a message indicating a call destined for the AT; and establishing, based on the message, a specific connection corresponding to the AT for carrying the call.

According to another aspect, an apparatus for establishing a connection in a wireless communications network including means for reserving a common connection for use by more than one access terminal (AT); means for associating the common connection with a network identifier corresponding to the AT; means for deleting a network identifier-related context (e.g., an Internet Protocol (IP)-related context) for the AT while maintaining the network identifier; means for transmitting a message, based on a call to the AT, via the common connection and based on the network identifier. In one example, a specific connection and a context for the network-identifier corresponding to the AT for carrying the call is based on a response to the message.

According to another aspect, an apparatus for establishing a connection in an access terminal (AT) including means for conducting a registration session with a wireless communications network; means for obtaining a network identifier corresponding to the AT based on the registration session; means for deleting a network identifier-related context (e.g., an Internet Protocol (IP)-related context) for the AT while maintaining the network identifier; means for receiving a message indicating a call destined for the AT; and means for establishing, based on the message, a specific connection corresponding to the AT for carrying the call.

According to another aspect, a computer program product, including a computer-readable medium including: codes for causing a computer to reserve a common connection for use by more than one access terminal (AT); codes for causing the computer to associate the common connection with a network identifier corresponding to the AT; codes for causing the computer to delete a network identifier-related context (e.g., an Internet Protocol (IP)-related context) for the AT while maintaining the network identifier; codes for causing the computer to transmit a message, based on a call to the AT, via the common connection and based on the network identifier. In one example, a specific connection and a context for the network-identifier corresponding to the AT for carrying the call is based on a response to the message.

According to another aspect, a computer program product, including a computer-readable medium including: codes for causing a computer to conduct a registration session with a wireless communications network; codes for causing the computer to obtain a network identifier corresponding to the AT based on the registration session; codes for causing the computer to delete a network identifier-related context (e.g., an Internet Protocol (IP)-related context) for the AT while maintaining the network identifier; codes for causing the computer to receive a message indicating a call destined for the AT; and codes for causing the computer to establish, based on the message, a specific connection corresponding to the AT for carrying the call.

Advantages of the present disclosure may include conserving resources and providing efficient network resource utilization.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
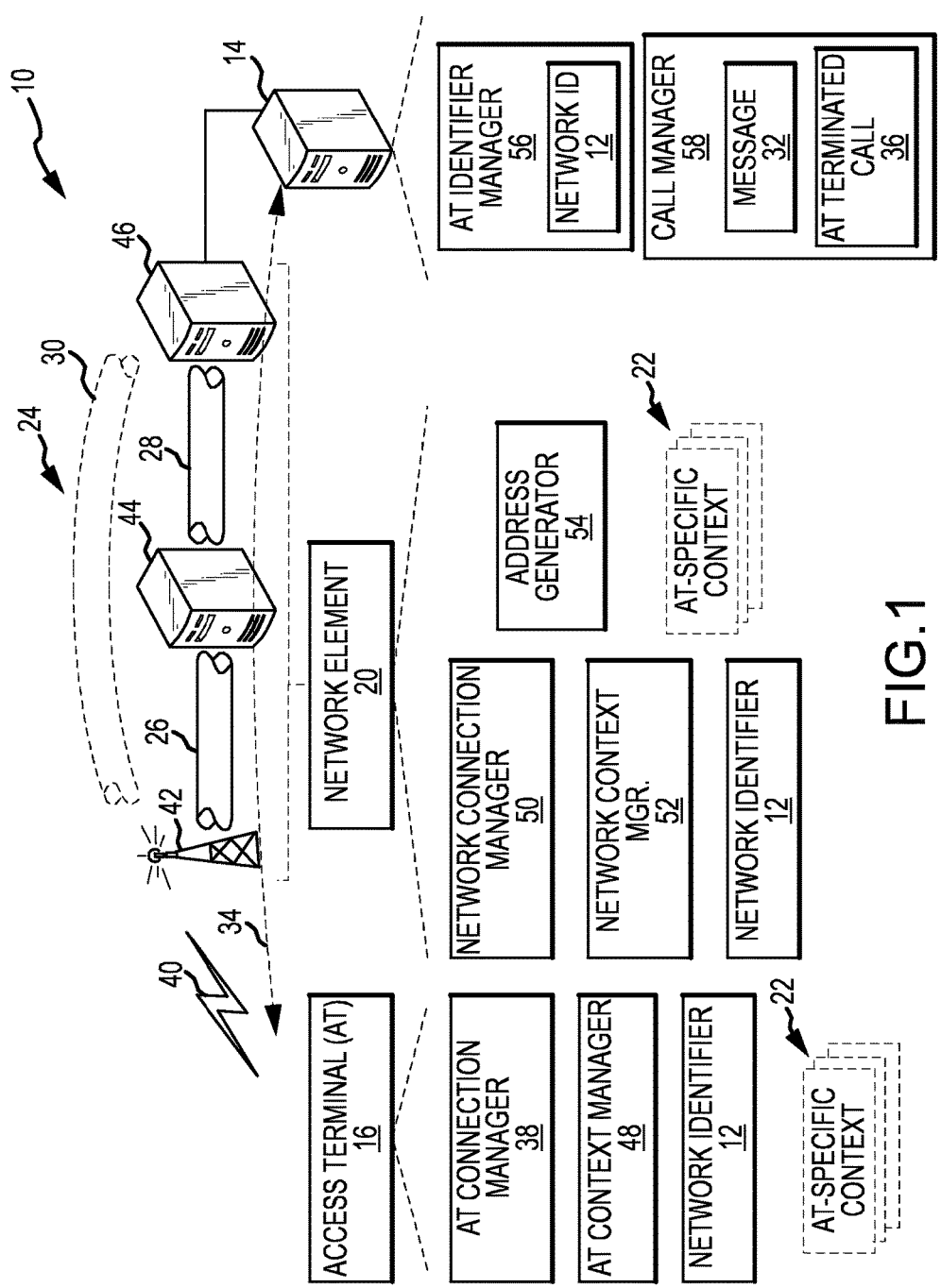
FIG. 1 illustrates an example schematic diagram for establishing a connection in a wireless communications network.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Mobile wireless communications involve an access terminal (AT) or user equipment (UE) interacting with a wireless communications network to originate or receive a call. A call originated by an AT is referred to as a mobile originated call, while a call received by the AT is referred to as a mobile terminated call.

To make or receive a call, a connection needs to be established between the AT and a wireless communications network. In establishing such a connection, an AT context is created at the various entities involved in a path that defines the connection between the AT and the wireless communications network. For example, in an example, the connection path may include, at least, the AT, a radio access network component, a packet data serving node (PDSN) or gateway component, and one or more core Internet Protocol (IP) network components, such as a mobility component. When a call is made, the connection path may further include another communication device, e.g., the call originator gateway component 14 (a.k.a. call originator) or call receiver. The type of connection between each of these entities may vary, and as such, there may be a separate, AT-specific context corresponding to each of the connections in the path. Each separate, AT-specific context may also be referred to as a per-AT context. Each AT-specific context comprises various parameters that define attributes and/or characteristics, e.g. associated with a respective protocol layer, supporting a respective one or more portion of the connection path.

In one example, when an access terminal is powered on, a connection is established and each of the connecting entities in the connection path maintains, until the AT is powered down, a per-AT context for the AT for the connection. Even when a call is not in process, the connecting entities reserve the resources for the connection. For example, to receive a call, e.g. a mobile terminated call, current architecture and protocols require that the session is setup between the AT and the wireless communications network. The model of multiple per-AT contexts is justifiable when calls occur frequently, e.g. when an inter-data-arrival time is small. However, when calls occur infrequently, a model that involves reserving a per-AT context and/or resource at the wireless communications network may be very expensive and inefficient.

In one aspect, the present disclosure discloses enabling a network identifier corresponding to an access terminal (AT) in a communications network to be maintained and used to reach the AT, while deleting one or more AT-specific contexts at the AT and at one or more network elements in order to conserve resources in the communications network. For example, in some aspects, an Internet Protocol (IP)-related context associated with the network identifier may be deleted. In other aspects, the IP-related context and a data link layer context may be deleted. In still other aspects, the IP-related context, the data link layer context and a radio link layer context may be deleted. Rather than maintaining AT-specific network resources, such as active connections, associated with each of these contexts, a common connection resource may be included with which the network identifier corresponding to the AT is associated. As such, for a mobile terminated call to the AT, the communications network is enabled to utilize the common connection resource to contact the AT, based on or using the network identifier, to trigger the AT to initiate the establishment of a connection having AT-specific contexts to carry the call.

In one example use case, which should not be construed as limiting, the present disclosure provide efficient network resource utilization in a communication network supporting an AT, or especially a plurality of ATs, having a relatively large inter-data-arrival time as compared to an AT that receives a plurality of calls. For example, a relatively large inter-data-arrival time may include, but is not limited to, a mobile terminated call once a day, or a few times a week, or a few times a month. For instance, a communications network that supports machine-to-machine (M2M) communications may benefit from the present disclosure, as M2M communications are expected to increase. For example, M2M communications may be utilized in smart grid technologies for managing energy consumption, such as in one or more appliances, in health monitoring applications, such as devices that monitor a condition of an individual, or in any other application where one or more remote devices or networks of remote devices infrequently receive communicates from across a communication network with a manager, host, server, hub or controller device.

FIG. 1 illustrates an example schematic diagram for establishing a connection in a wireless communications network. Referring to FIG. 1, in one aspect, the wireless communications network 10 enables a network identifier 12 to be obtained and registered with a call originator gateway component 14 (a.k.a. call originator) to identify an AT 16. Further, wireless communications network 10 enables one or more network elements 20 and/or the AT 16, to delete one or more AT-specific contexts or resources 22 when the AT 16 is not in an active call or data connection.

In one example, the wireless communications network 10 may reserve one or more common connections 24, such as indirect common connections 26 and 28, or direct common connection 30, associated with the network identifier 12. Accordingly, the wireless communications network 10 enables the call originator gateway component 14 to transmit a message 32 via the one or more common connections 24, using or based on network identifier 12, to notify the AT 16 to establish an AT-specific connection 34 corresponding to the AT 16 for supporting a mobile terminated call 36 to the AT 16.

For example, AT-specific connection 34 may have a plurality of AT-specific contexts or resources 22, such as various parameters that define attributes and/or characteristics, Quality of Service (QoS) details, security keys, protocol data, e.g. associated with a respective protocol layer, for use in a session supporting one or more portions of the connection 34. In one aspect, the wireless communications network 10 may be efficiently scaled to handle a plurality of access terminals having relatively infrequent mobile terminated calls, or in other words, relatively infrequent inter-data-arrival times. Thus, the wireless communications network 10 efficiently utilizes network resources by deleting connections and AT-specific contexts and resources when the AT 16 is not in an active call or data connection, while still allowing the AT 16 to be contacted to establish a connection with AT-specific resources for carrying a mobile terminated call to the AT 16.

In one aspect, the AT 16 may include an AT connection manager component 38 configured to establish communications with wireless communications network 10. As noted above, the communications network 10 may include one or more network elements 20.

For example, using the terminology of an Evolution-Data Optimized (EVDO) technology, although not limited thereto, the AT connection manager 38 may establish a connection that includes an air or wireless link 40 with an access node (AN) 42 (a.k.a. radio access network (RAN)), and the connection path may further include a packet data serving node (PDSN) 44, a mobility element 46 (such as a home agent (HA), a local mobility anchor (LMA) or a combination a home agent/local mobility anchor (HA/LMA)). Further, in the case of a mobile terminated call, the connection path may further include the call originator gateway component 14, such as controller, M2M server (a.k.a. M2M gateway) etc. It should be understood that although EVDO terminology is used in this example, the described aspects may apply to any other telecommunications technology or standard.

During a connection establishment process, the AT connection manager 38 may be further configured to initiate a registration of the network identifier 12 with the call the originator gateway component 14, thereby enabling the call the originator gateway component 14 to contact the AT 16 without any established AT-specific connection.

During the call establishment process, the AT connection manager 38 may operate in cooperation with an AT context manager component 48 to establish and maintain one or more AT-specific contexts 22 for use during active calls or data connections with the wireless communications network 10.

In one aspect, during a period after registration when no active call exists, the AT connection manager 38 may operate in cooperation with the AT context manager 48 to maintain the network identifier 12 while deleting all or some portion of the one or more AT-specific contexts 22. For example, after the registration with the call originator gateway component 14, in some aspects, the AT context manager 48 deletes an Internet Protocol (IP)-related context associated with the network identifier 12. In other aspects, the AT context manager 48 deletes the IP-related context and a data link layer context, such as a Point-to-Point Protocol (PPP) context. In still other aspects, the AT context manager 48 deletes the IP-related context, the data link layer context and a radio link layer context, such as but not limited to a high rate packet data context.

Additionally, during a period after registration, the AT connection manager 38 is configured to monitor, e.g., periodically, air link 40 with access node 42 to detect message 32. Upon detecting message 32, the AT connection manager 38 is configured to initiate the connection establishment process to create AT-specific connection 34 having one or more AT-specific contexts 22.

Moreover, in some aspects, the AT connection manager 38 may be configured to update the network identifier 12 when the AT 16 moves to a new area served by a new access node. For example, in an aspect, the AT connection manager 38 may associate the network identifier 12 with a particular AN 42, and thus upon receiving notice from a communications component of a new serving AN, the AT connection manager 38 may be triggered to initiate a new connection establishment process to obtain an updated network identifier and to register the updated network identifier with the call originator gateway component 14.

In one aspect, each or some combination of the one or more network elements 20 may include a network connection manager component 50 configured to establish communications with the AT 16, with other ones of the network elements 20, or with the call originator gateway component 14.

During the call establishment process, each network connection manager 50 may operate in cooperation with a corresponding network context manager component 52 to establish and maintain one or more AT-specific contexts 22 at the respective network element 20 for use during active calls or data connections with the wireless communications network 10.

In some aspects, during a period after registration when no active call exists with AT 16, one network connection manager 50 located at one of the network elements 20 may operate in cooperation with the corresponding network context manager 52 to maintain the network identifier 12 while deleting all or some portion of the one or more AT-specific contexts 22. For example, after the registration of the AT 16 with the call originator gateway component 14, all the network context managers 52 may delete an Internet Protocol (IP)-related context associated with network identifier 12. In other aspects, all the network context managers 52 may delete the IP-related context and a data link layer context, such as a Point-to-Point Protocol (PPP) context. In still other aspects, all the network context managers 52 may delete the IP-related context, the data link layer context and a radio link layer context, such as but not limited to a high rate packet data context. Also, in some aspects, the network connection manager 50 may maintain network identifier 12 in association with the common connection 24 so as to know to direct a communication addressed with the network identifier 12 via the common connection 24.

Additionally, during a period after registration, each network connection manager 50 is configured to monitor the common connection 24, or a separate connection to the call originator gateway component 14, to detect message 32. Upon detecting message 32, the respective network connection manager 50 is configured to transmit message 32, with or without transforming message 32, to a next one of the network elements 20 or to the AT 16 to make the AT 16 aware of a mobile terminated call to the AT 16. In some aspects, a respective network connection manager 50 may transform message 32 by replacing the network identifier 12 with a terminal identifier, such as a Unicast Access Terminal Identifier (UATI), to address message 32 to the AT 16 in a particular subnet. In another aspect, the network connection manager may page the AT using an URL as an identifier to identify the AT. In yet another aspect the network connection manager may page the AT using an IP address as an identifier to identify the AT.

Moreover, at least one network element 20 may include, or be in communication with, an address generator component 54 configured to generate the network identifier 12. For example, the address generator component 54 may execute a Dynamic Host Configuration Protocol (DHCP) to generate the network identifier 12 in the form of an IP address.

In one aspect, the call originator gateway component 14 may include an AT identifier manager component 56 to store an association between each AT 16 and the corresponding network identifier 12. Additionally, in some aspects, the AT identifier manager 56 may further associate one or more network elements 20, or common connection 24, or a terminal identifier such as the UATI, or any combination thereof, with each AT 16 and the corresponding network identifier 12.

In one aspect, the call originator gateway component 14 may include a call manager 58 configured to receive or generate a mobile terminated call 60 (not shown) to a respective AT 16. Also, based on detecting or generating the mobile terminated call 60, the call manager 58 is configured to generate message 32 to notify the AT 16 of the mobile terminated call 60 and thereby trigger the AT 16 to initiate AT-specific connection 34 to support the mobile terminated call 60. For example, call manager 58 may operate in cooperation with the AT identifier manager 56 to obtain the respective network identifier 12 associated with the respective AT 16, and to direct message across the wireless communications network 10 based on the network identifier 12. For example, in some aspects, the message 32 may include the network identifier 12, while in other aspects, the call manager 58 may map the network identifier 12 to the terminal identifier, such as the UATI, and include the terminal identifier in message 32.

In one example, in an M2M use case, the functionality described herein may be performed or managed by an M2M client component, application or module on the AT 16, an M2M network component, application or module on each network element 20, and an M2M server component, application or module on the call originator gateway component 14, which may include an M2M server.

Figure 2:
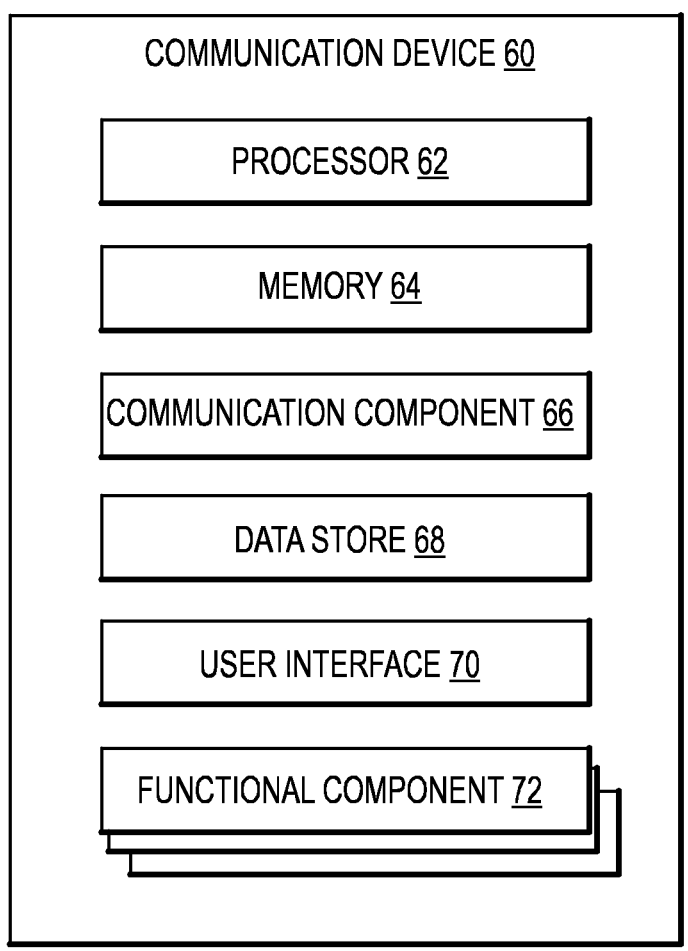
FIG. 2 is an example schematic diagram of a communication device representing one or more components of the wireless communications network of FIG. 1.

FIG. 2 is an example schematic diagram of a communication device representing one or more components of the wireless communications network of FIG. 1. Referring to FIG. 2, in one aspect, any one or any combination of the AT 16, the network elements 20, or the call originator gateway component 14 (shown in FIG. 1) may be represented by the communication device 60. Communication device 60 includes a processor 62 for carrying out processing functions associated with one or more of components and functions described herein. Processor 62 may include a single processor or multiple sets of processors or multi-core processors. Moreover, processor 62 may be implemented as an integrated processing system and/or a distributed processing system. For example, processor 62 may include one or more processing units configured to execute the functionality described herein with respect to the connection managers, content managers, address generator, network identifier manager, and call manager components, or any other component or functionality described herein.

In one example, communication device 60 includes a memory 64, such as for storing local versions of applications or components being executed by processor 62. Memory 64 may include any type of memory usable by a computer, such as random access memory (RAM), read only memory (ROM), tapes, magnetic discs, optical discs, volatile memory, non-volatile memory, or any combination thereof. For example, memory 64 may store a local version of software, computer executable code, etc., for the described connection managers, content managers, address generator, network identifier manager, and call manager components, or any other component or functionality described herein.

In one aspect, communication device 60 includes a communications component 66 that provides for establishing and maintaining communications with one or more entities or components utilizing hardware, software, and/or services as described herein. Communications component 66 may carry communications between components on communication device 60, as well as between the communication device 60 and external devices, such as devices located across a communications network and/or devices serially or locally connected to the communication device 60. For example, communications component 66 may include one or more buses, and may further include transmit chain components and receive chain components associated with and including a transmitter and receiver, respectively, or a transceiver, operable for interfacing with external devices. For example, the communications component 66 may transmit or receive communications relating to connection establishment or release, context establishment or deletion, notification messages or pages, etc., or any other communications-related messages described herein.

In one example, communication device 60 includes a data store 68, which may be any suitable combination of hardware and/or software for providing mass storage of information, databases, components and/or programs employed in connection with aspects described herein. For example, the data store 68 may be a data repository for applications or components not currently being executed by processor 62. For example, the data store 68 may include a mass storage version of software, computer executable code, etc., for the described connection managers, content managers, address generator, network identifier manager, and call manager components, or any other component or functionality described herein.

Communication device 60 may include a user interface component 70 operable to receive inputs from a user of the communication device 60, and further operable to generate outputs for presentation to the user. User interface component 70 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, the user interface component 70 may include one or more output devices, including but not limited to a display, a speaker, a haptic feedback mechanism, a printer, any other mechanism capable of presenting an output to a user, or any combination thereof. In one aspect, the user interface component 70 may be utilized to receive and present information to, or receive and transmit information from, a user of any of the AT, network elements and/or call originator gateway component.

In one example, the communication device 60 may include one or more functional components 72. For example, for an access terminal aspect, the functional components 72 may include aspects of the AT connection manager 38 and/or the AT context manager 48. Further, for example, for a network element aspect, functional components 72 may include aspects of the network connection manager 50, the network context manager 52, and/or the address generator 54. Additionally, for example, for a call originator gateway component aspect, the functional components 72 may include aspects of the AT identifier manager 56 and/or the call manager 58.

Figure 3:
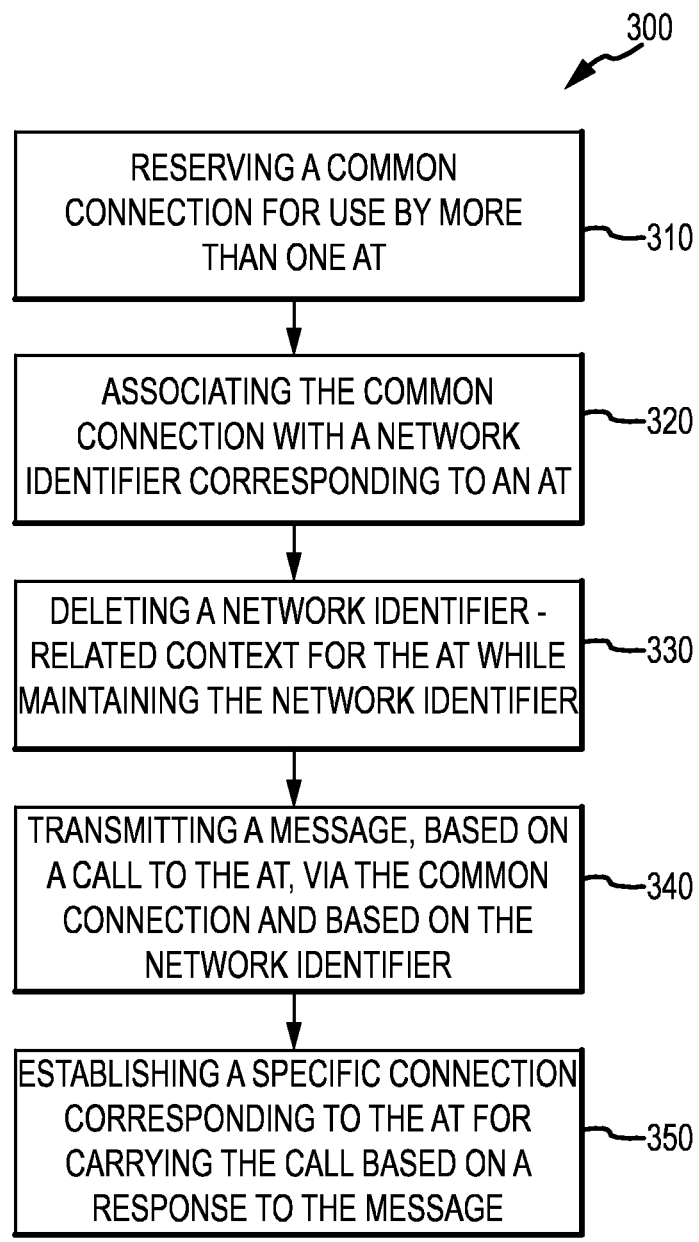
FIG. 3 is an example flow diagram for establishing a connection in a wireless communications network.

FIG. 3 is an example flow diagram 300 for establishing a connection in a wireless communications network. In block 310, reserve (e.g., between network-side communication elements) a common connection for use by more than one access terminal. For example, in one non-limiting aspect, a common A10 connection may be established between a radio access network (RAN) element and a packet data switching node, and a common mobile Internet Protocol (MIP) tunnel may be established between the packet data serving node (PDSN) and another IP network-side element, such as but not limited to, a home agent (HA), a local mobility anchor (LMA), a call originator gateway component, or any combination thereof. Such a common connection may be reserved for communications associated with ATs that do not have AT-specific contexts established. In another aspect, an IP-in-IP tunnel may be established to directly connect a radio access network (RAN) element with another IP network-side element, such as a home agent, local mobility anchor, call originator or gateway, or any combination thereof, thereby bypassing the PDSN element. In one example, the common connection is reserved by the AN, the PDSN or both.

In block 320, associate the common connection with a network identifier corresponding to the access terminal in the wireless communications network. In one example, the association is based on a registration session by an access terminal. In one example, the AT establishes a radio link layer session, a data link layer session and/or an IP network layer session to obtain a network identifier to identify the AT in the wireless communications network. In one example, also register the obtained network identifier with an entity that desires to contact the AT, such as but not limited to one or more of a call originator gateway, or an M2M server.

In block 330, delete a network identifier-related context for the access terminal (AT) while maintaining the network identifier. In one variation, delete an Internet Protocol (IP)-related context and PPP context for the access terminal (AT) while maintaining the IP address corresponding to the access terminal. In one example, the AT is associated with the registration session. For example, in order to conserve network resources, at least an IP-related context is deleted at one or more network entities. In other aspects, a plurality of AT-specific contexts corresponding to a PPP session (e.g., a data link layer session) and an IP network layer session are deleted. In yet another aspect, all AT-specific contexts are deleted. In one example, the network identifier is an IP address or an Universal Resource Locator (URL).

In block 340, transmit a message, based on a call to the access terminal (AT), via the common connection and based on the network identifier corresponding to the access terminal (AT). In one example, a wake up message is transmitted to the AT based on the network identifier. For instance, the access node may page the AT using the IP address in the air interface. In yet another aspect, the wake up message may be a hierarchical message that identifies the network identifier, as well as the network-specific addresses of the network elements in the path to the AT. In another example, the message may include the network identifier, and one or more network elements may include mappings that allow the respective network element to convert the network identifier to a device-specific identifier, such as a Unicast Access Terminal Identifier (UATI). In still other aspects, a first hop network element, e.g., a first network element on the path to the AT from a home agent, local mobility anchor, call originator gateway component, a gateway, or any combination thereof, or a M2M server, may include the mapping such that the message may be initially transmitted with a device-specific identifier.

In block 350, establish a specific connection corresponding to the access terminal (AT) for carrying the call based on a response to the message. In one example, establish a specific connection and a context for the network-identifier corresponding to the AT for carrying the call based on a response to the message. For example, network elements may communicate with the AT to establish AT-specific sessions, such as a radio link layer, a data link layer and/or an IP network layer session, that define a connection for carrying a mobile- or AT-terminated call. In one example, the flow diagram 300 further includes constructing a hierarchical IP address for the message, such as but not limited to, a wake up message, a page or a hierarchical message. And, for example, the page may use an air-interface paging with an IP-address, an Universal Resource Locator (URL) or a network address identifier (NAI) as the network identifier. In one example, the specific connection is established by the AN.

In one example, the flow diagram 300 further includes deriving an Unicast Access Terminal Identifier (UATI) from an IP address a data packet header of the message.

Figure 4:
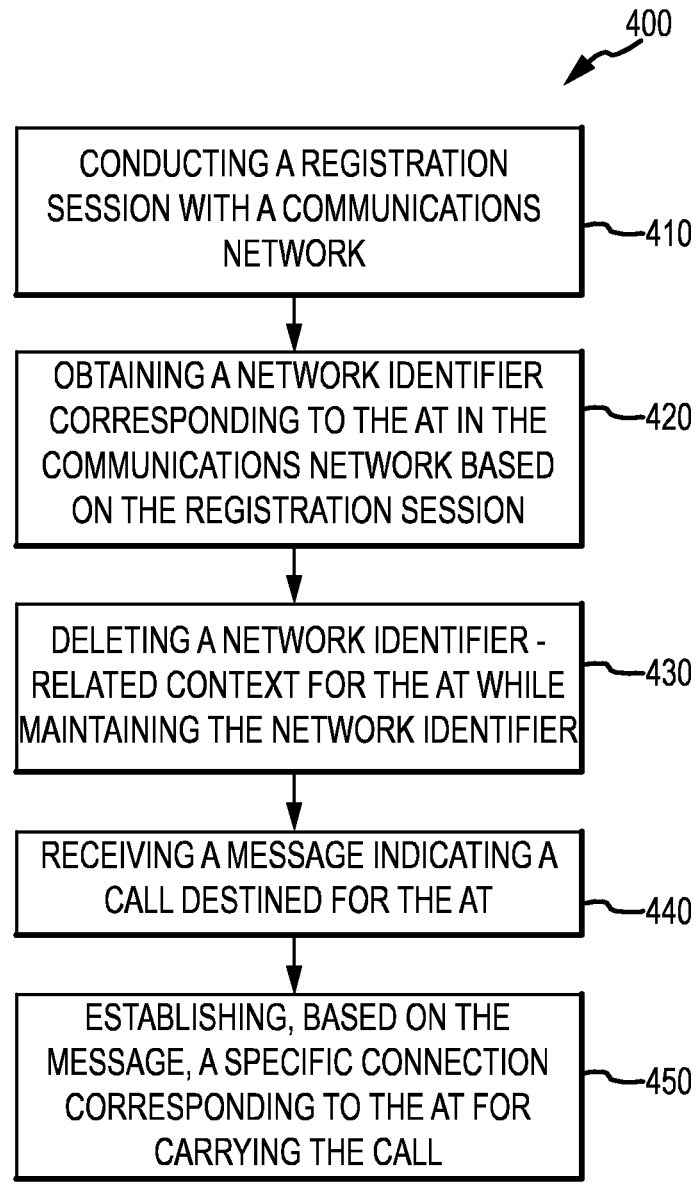
FIG. 4 is an example flow diagram for establishing a connection in an access terminal (AT).

FIG. 4 is an example flow diagram 400 for establishing a connection in an access terminal (AT). In block 410, conduct a registration session with a communications network. In one example, the communications network is a wireless communications network. The AT may communicate with one or more network elements to establish AT-specific sessions, such as a radio link layer, a data link layer and/or an IP network layer session that define a connection with the communications network.

In block 420, obtain a network identifier corresponding to the access terminal in the communications network based on the registration session. Based on the established connection, the AT may obtain a network identifier, such as an IP address, or URL, that identifies the AT in the communications network to allow communications to be addressed to the AT. After obtaining the network identifier, the AT may initiate registration of the network identifier with any entity desiring to contact the AT, such as a home agent, a local mobility anchor, a call originator or gateway, an M2M server or M2M gateway, or any combination thereof.

In block 430, delete a network identifier-related context for the access terminal (AT) while maintaining the network identifier. In one variation, delete an Internet Protocol (IP)-related context for the access terminal (AT) while maintaining the IP address. In one example, the AT is associated with the registration session. In order to conserve AT (and network) resources, in one aspect, at least an IP-related context is deleted. In other aspects, a plurality of AT-specific contexts corresponding to a PPP session (e.g., a data link layer session) and an IP network layer session, are deleted. In yet another aspect, all AT-specific contexts are deleted.

In block 440, receive a message indicating a call destined for the access terminal (AT). In one example, the message may include a wake up message. In one example, a call is a session for communication. In block 450, establish, based on the message, a specific connection corresponding to the access terminal for carrying the call. In one example, the specific connection is established based on the message. In one aspect, the connection may include the AT-specific connection, and corresponding sessions/contexts.

Several possible data transfer models for machine to machine (M2M) services may be used in accordance with the present disclosure. One skilled in the art would understand that the example models disclosed herein are not meant to be exclusive and that other models may be used without affecting the spirit or scope of the present disclosure. In a first example, the model includes only AT-initiated data transfer with no "push" data or server request. For example, the first example model may include device-initiated reporting devices such as a meter-reading report generator which operates monthly. In a second example, the model includes both AT-initiated and network-initiated data transfer with a "push" service and a service request from a wireless network. In one aspect, for the second example model, response time may not be very critical where a response time on the order of seconds to minutes may be tolerable. For example, the second example model may include a case with large inter-data interval times (e.g., on the order of hours or days) such as a smart grid control of home devices (e.g., heater, air conditioning, etc.). For a third example model, there may be both AT-initiated and network-initiated data transfer as in the second example model, but with more time sensitivity and shorter inter-data interval times (e.g., on the order of minutes). For example, the third example model may include a medical device for monitoring medical conditions.

Figure 5:
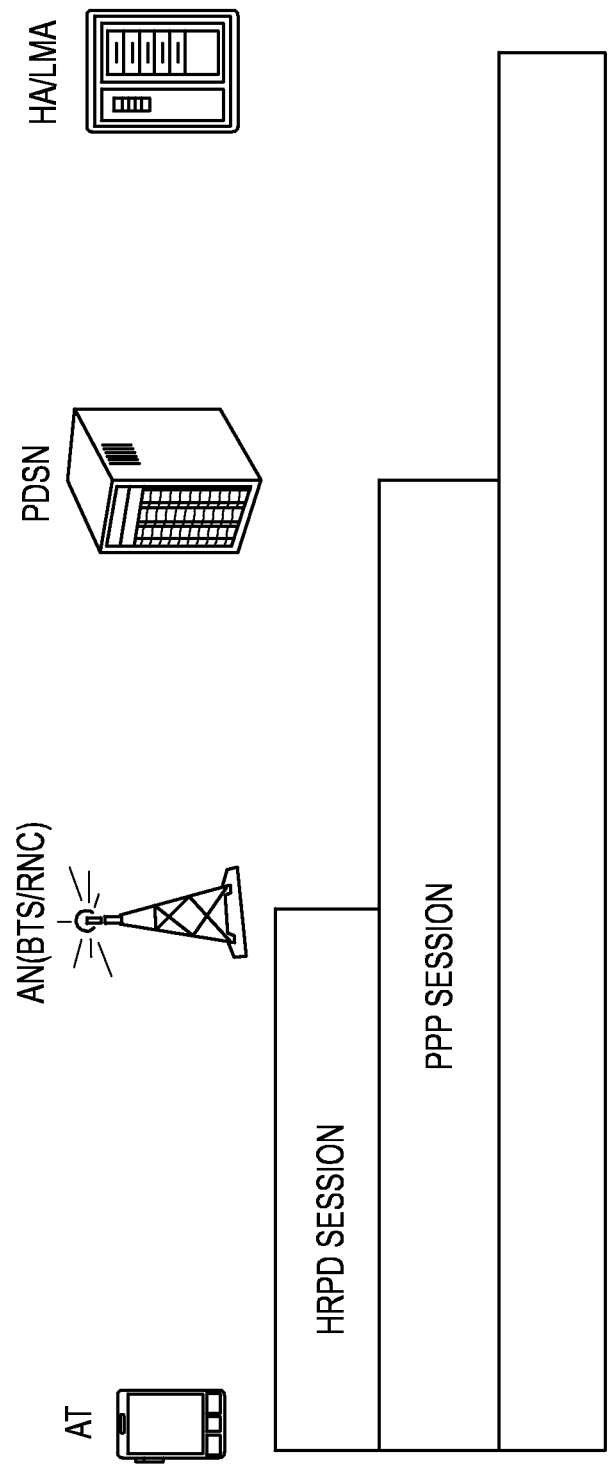
FIG. 5 illustrates an example of a prior art mobile terminated data call with an access terminal (AT), an access node (AN), a packet data serving node (PDSN), and a home agent/local mobility agent (HA/LMA).

FIG. 5 illustrates an example of a prior art mobile terminated data call with an access terminal (AT), an access node (AN), a packet data serving node (PDSN), and a home agent/local mobility agent (HA/LMA). An AT-specific context is maintained at the AN, PDSN and HA/LMA throughout a lifetime where the AT is to be reached. For example, a high rate packet data (HRPD) session may be maintained between the AT and AN, a point to point protocol (PPP) session may be maintained between the AT and PDSN, and an IP session may be maintained between the AT and the HA/LMA.

In one aspect, a use case for machine to machine (M2M) devices presents a different operational concept than a use case for current devices such as voice over IP (VoIP) calls, email push, etc. In one example, the current device use case does not scale well with higher network resource demand. Table 1 compares the differences in operational concepts for the two use cases.

TABLE 1

| Current Devices/Use Cases | M2M Devices (type II) |
|---|---|
| (e.g., VoIP calls, E-mail push, etc.) | (e.g., smart meter, etc.) |
| smaller call interval time | larger call interval time |
| frequent incoming calls (many per day) (e.g., VoIP calls, e-mails, etc.) | (e.g., data call once per day or less) |
| smaller response time (e.g., in the range of milli-seconds to seconds) | larger response time (e.g., in the range of seconds to minutes) |
| high mobility (device moves with the user) | low mobility (devise are mostly in fixed locations such as homes, but an exception may include, for example, automobiles, etc.) |
| # of devices (typically one per person) | # of devices (many per location, such as a home) |

Figure 6:
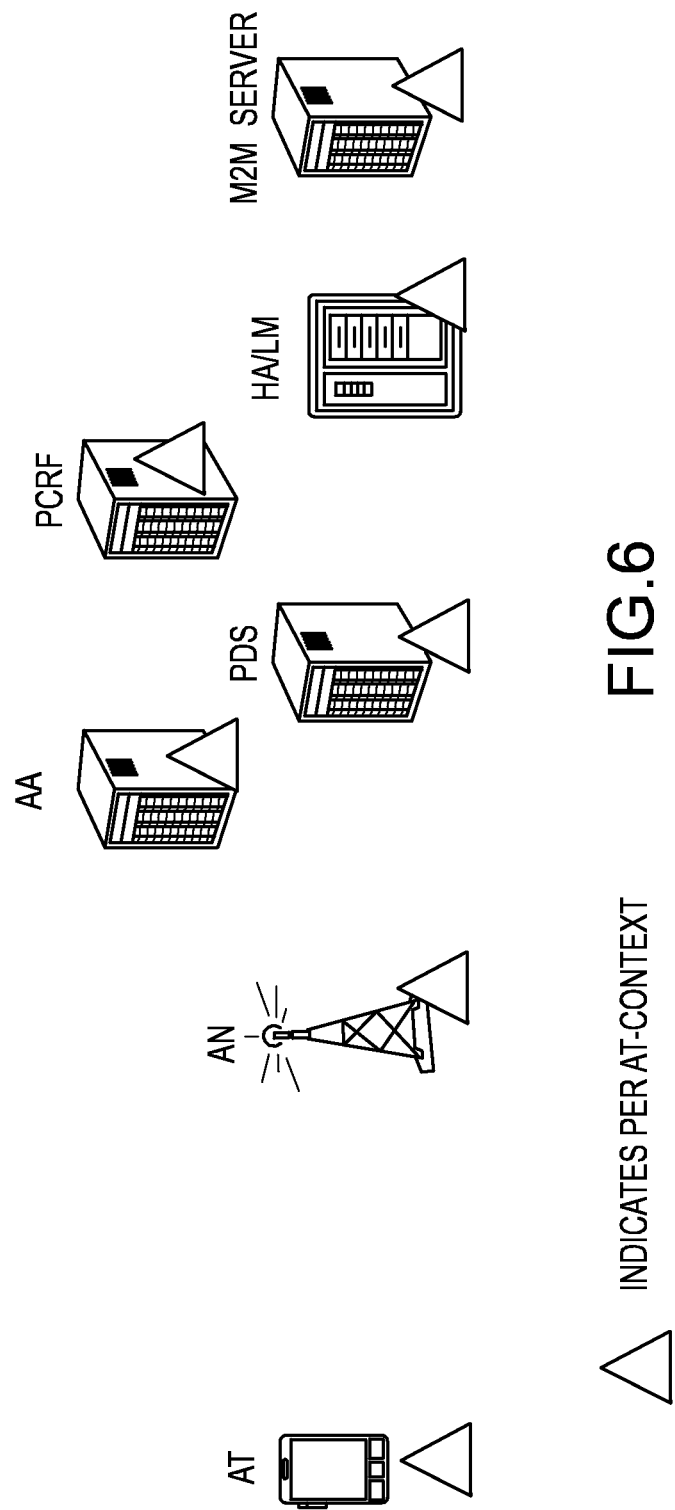
FIG. 6 illustrates an example of a current data session model.

FIG. 6 illustrates an example of a current data session model with an access terminal (AT), an access node (AN), a packet data serving node (PDSN), a home agent/local mobility agent (HA/LMA), a machine to machine (M2M) server, an authorization-authentication-accounting (AAA) module, and a policy charging and rules function (PCRF) unit. One skilled in the art would understand that other components may be included or that some of the components shown may not be necessary or used in another data session model without affecting the spirit or scope of the present disclosure. In one aspect, a per-AT context is allocated and maintained among various network elements throughout an entire data session (i.e., a period where the AT is reachable). For example, maintaining a per-AT context may be inefficient when an inter-call interval time is very long and when a response time is not very critical. In one example, the current data session model with the AT-specific context may not scale well because of this inefficiency.

In another aspect, there may be several desirable requirements for M2M services. For example, it may be desirable to keep minimal per-AT context information in the network elements when the AT 16 is not in an active data session. For example, for a usage of a wireless aggregation point, it may be desirable to allow multiple M2M devices, addressable by a call originator gateway component or a M2M server, to share a single wireless device or AT as a backhaul to communicate with the M2M server. In one example, the M2M server may be able to address directly the M2M device, transparent to the wireless aggregation point. For example, it may be desirable to support both Internet Protocol version 6 (IPv6) and Internet Protocol version 4 (IPv4). It may be desirable to use only IPv6 for M2M devices, however both IPv4 and IPv6 addressing may be allowed.

Figure 7:
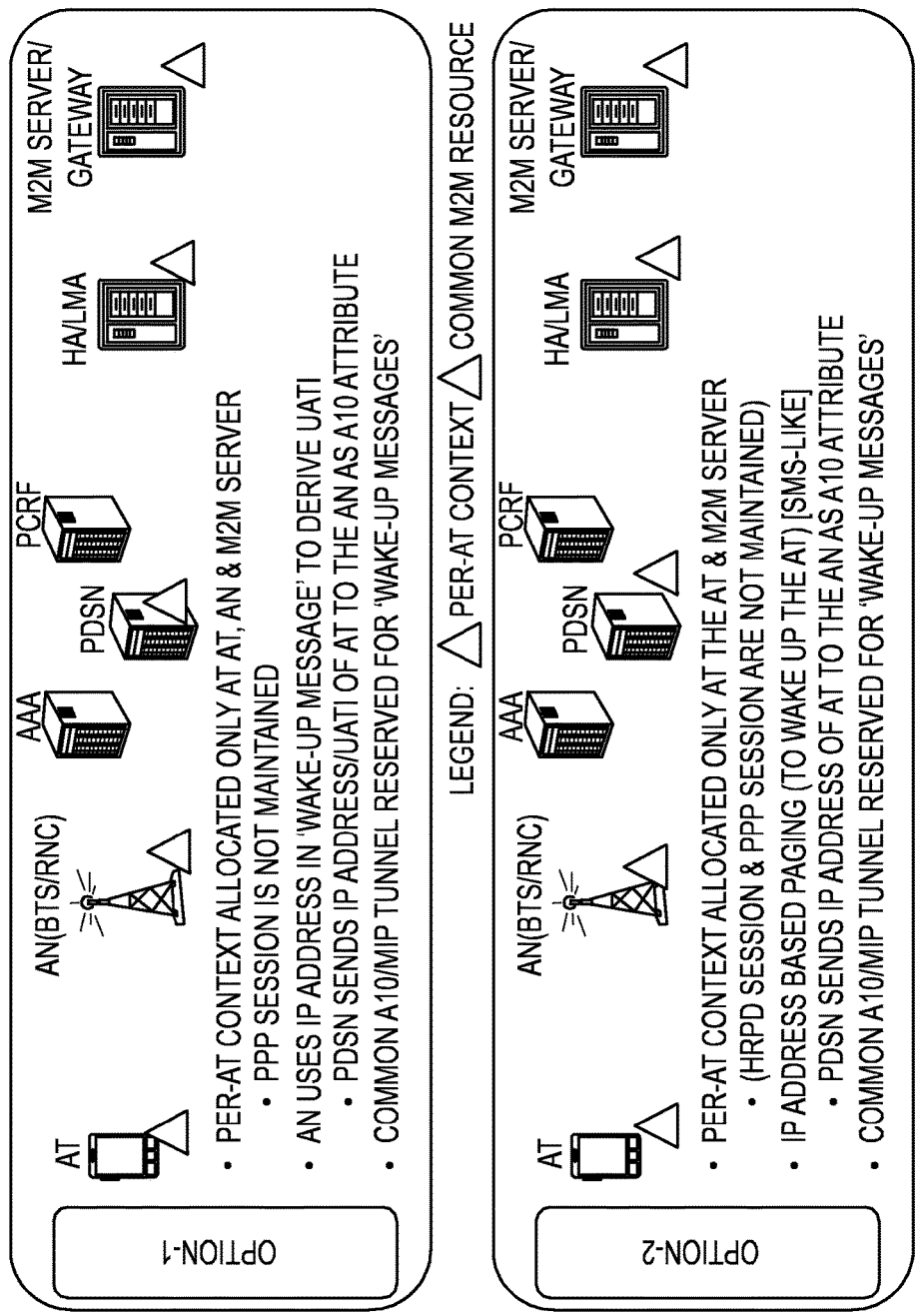
FIG. 7 illustrates an example data session model for M2M services with two different data session model options.

FIG. 7 illustrates an example data session model for M2M services with two different data session model options. For a first model option (option 1), a per-AT context is allocated only at an AT, an AN, and a M2M server wherein a PPP session is not maintained. In one example, the AN uses an IP address in a wake up message mode to derive a unicast access terminal identifier (UATI). For example, the PDSN sends an IP address or the Unicast Access Terminal Identifier (UATI) of the AT to the AN as an A10 attribute. In one aspect, the A10 attribute is an interface parameter. In another aspect, a common A10/mobile IP tunnel is reserved for wake up messages.

In option 1, a per-AT context 22 (as shown in FIG. 1) is allocated only at the AT 16, the AN 42 and the call originator gateway component 14 (a.k.a. for this case as a M2M server). For example, a PPP session is not maintained, however, a radio link layer, e.g. HRPD session, is maintained. For example, the AN 42 uses the network identifier 12 (e.g., the IP address) in a message 32 (such as a wake up message) to derive the Unicast Access Terminal Identifier (UATI) of the AT 16. For example, PDSN 44 sends the network identifier 12 (e.g., the IP address of the AT 16 to the AN 42 as an A10 message attribute). Additionally, the common connection 24 may be reserved in the wireless communication network 10 for message 32. For example, common connection 24 may include an A10 connection between AN 42 and PDSN 44, and a mobile IP (MIP) tunnel between PDSN 44 and mobility element 46 (e.g., home agent/local mobility agent (HA/LMA)).

In one example, the following 7 steps summarize option 1. Steps 1-3 relate to a data session registration for the AT to obtain an IP address and to register the IP address with the M2M server/gateway. Steps 4-7 relate to establishing an AT terminated data call or connection.

1. AT initiates data session (e.g. at power up); HRPD session and PPP session is setup, which is followed by IP address allocation.
2. Allocated IP address is registered with the M2M server
3. PPP session is closed; IP address is maintained at the AT and the M2M server. The IP address that was associated with the PPP session is now associated with the common MIP tunnel and the "common A10". The AN maps the IP address to the UATI that is to be used at the air interface.
4. The M2M server sends wake-up message to the AT with the IP address allocated at step 1; common MIP tunnel is used to send the message 5. The PSDN sends a wake-up message to the AN using "common A10"

6. The AN uses the IP address to derive the Unicast Access Terminal Identifier (UATI) and pages the AT 7. The AT sets up a PPP session; data transfer commences In one aspect, in step 1, the AT initiates a data session (e.g., a connection), for example, at power-up, establishing AT-specific contexts including a radio link layer context (e.g., HRPD context) and a data layer link and IP layer content (e.g., PPP context). And, in step 1, a network identifier 12 (e.g., an IP address) is obtained. In step 2, the network identifier 12 is registered with the M2M server. In step 3, the PPP session is closed, thereby causing deletion of the corresponding AT-specific contexts, while maintaining network identifier 12 at the AT 16 and the M2M server and while maintaining the radio link layer AT-specific context (e.g., the HRPD context)

In step 4, the M2M server sends the message 32 (e.g., wake up message) to the AT 16 using the network identifier 12 (e.g., IP address) via the common connection 24 (e.g., MIP tunnel). In step 5, the PDSN 44 sends the message 32 to the AN 42 using the common connection 24 (e.g., A10 connection). In step 6, the AN 42 uses the network identifier 12 (e.g., IP address) in message 32 to derive the Unicast Access Terminal Identifier (UATI) of the AT 16 and pages the AT 16. In one example, the UATI is derived based on a network identifier to terminal identifier mapping maintained at the AN 42. In step 7, the AT 16 establishes a specific connection (e.g., a PPP session) having AT-specific contexts to support the AT terminated call. Following this, data transfer ensues.

Figure 8:
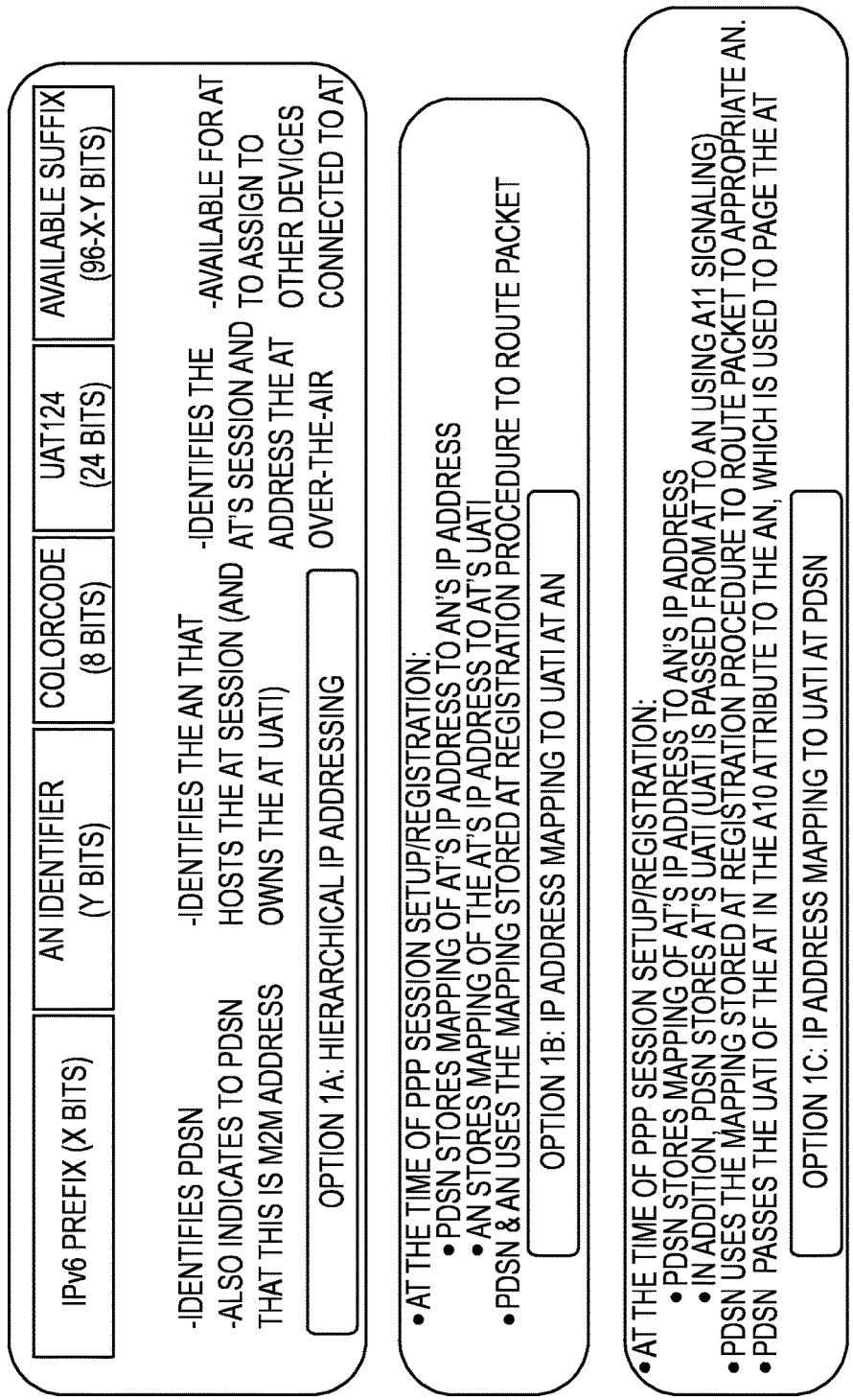
FIG. 8 illustrates examples of three different formats for deriving the identifier for a wake up message.

FIG. 8 illustrates examples of three different formats for deriving the identifier for a wake up message. Any of the three formats may be used for directing a wake up message to the AT. For example, in option 1a, the wake up message includes a hierarchical format with a plurality of fields as shown. The identifier may be implicitly derived based on the location of the device and the radio level identifier. Option 1a avoids the need for any network element to maintain a mapping associating one network identifier with another. In another example, option 1b includes a mechanism in which the IP address mapping to a Unicast Access Terminal Identifier (UATI) is maintained at the AN. In another example, option 1c includes a mechanism in which the IP address mapping to a UATI is maintained at the PDSN.

In one aspect, option 1a uses an IPv6 mode that uses an address allocation procedure for the AT. In one example, the allocation procedure defines a format in an IPv6 addressing scheme that includes the following information in the IP address fields:

IPv6 prefix (x bits): identifies PDSN
AN ID: y bits
AN color code: 8 bits
AN UATI: 24 bits In one example, x=64 bits (e.g. IPv6/64 prefix) and y=32 bits (e.g. AN ID=AN IPv4 address). In another example, for 1x/UMTS systems, international mobile subscriber identity (IMSI) or temporary mobile subscriber identity (TMSI) may be used instead of UATI. In another aspect, for routing of the wake up message, the M2M server sends to a PDSN (e.g., using simple IP) based on an IPv6 prefix. The PDSN sends an A10 packet to the AN based on the AN ID (e.g., an A10 packet contains ColorCode+UATI in generic routing encapsulation (GRE) attribute). In one example, the AN uses the ColorCode+UATI to page the AT.

In one aspect, option 1b uses an IP address mapping to the UATI (at AN). In one example, option 1b may use either IPv4 and/or IPv6 addresses. In another example, option 1b may use Simple IP, Proxy Mobile IP (PMIP) or Client Mobile IP (CMIP). In one aspect a data session registration procedure includes one or more of the following features:

A unique IPv6 prefix/IP v4 address is assigned for the AT (i.e. wireless device) by the packet data serving node (PDSN) (in case of Simple IP) or by the local mobility anchor (LMA) (in case of PMIP) or by the home agent (HA) (for Client Mobile IP)

In case of IPv 4 address, the Private IPv4 address may be allocated to save the IPv4 address space. For example, if the private IPv4 address is used, a network address translation (NAT) is used at the PDSN/LMA/HA to translate the private IP address into public IP address+port number The PDSN adds an entry which maps the AT's IPv6 prefix/IPv4 address to the AN with which the AT is associated The PDSN sends the AT IP address to the AN in an A11 Session-Update; The AN adds a mapping entry, which maps the AP IPv6 prefix/IPv4 address to the AT's UATI The AT performs M2M registration with the M2M server using IPv6 address or IPv4+port-number The PPP session is closed; the allocated IP address is retained In one aspect, options for preserving the IP address even after a PPP connection is closed are as follows: (1) The M2M gateway is integrated with the HA/LMA; the M2M registration/deregistration is used to preserve/release IP address; (2) The M2M gateway hosts the dynamic host configuration protocol (DHCP) server to assign the IP address M2M for the M2M devices; In one example, the PDSN/HA/LMA contacts M2M gateway to obtain the IP address when the PPP session setup/address allocation procedure is performed by M2M device; (3) The PDSN/HA indicates to the authorization-authentication-accounting (AAA) module that the IP address is not to be released. In another aspect, a domain name system (DNS) server still maintains the entry for the IP address mapping.

In another example, for AT-terminated data calls, routing of wake up messages may include one or more of the following:

The M2M server sends a wake up message to the PDSN/LMA/HA, in case of Simple IP/PMIP/CMIP (i.e., in case of PMIP/CMIP, LMA/HA routes the message to PDSN using 'common MIP tunnel')

The PDSN routes the wake up message to the appropriate AN based on the 'IP-address to common A10 mapping'

If the PDSN sent the AT's IP address in an A10 attribute, then the AN maps the AT's IP address sent in the A10 attribute to map to the AT's Unicast Access Terminal Identifier (UATI)

The AN pages the AT using the UATI

In another aspect, for the case of an IPv6 address, an IPv6 prefix (with 64 bits) is assigned to the AT. A unique interface ID is generated for each M2M device connected to the wireless device or AT, e.g. a wireless aggregation point. In one example, the M2M devices use a full IPv6 address (i.e., prefix of the AT+unique interface ID) for the M2M registration. In another aspect, for the case of an IPv4 address, a private IP address may be used to conserve the IP address space. In one example, the AT includes or accesses a network address translation (NAT) function and both an IP address and a port number are used for device registration by a M2M server.

In another aspect, for data session registration procedure, functionality may be similar to what has been previously described, except for the following differences:

The AN sends a 128 bit UATI of the AT to the PDSN during the PPP session setup (e.g. 128 bit UATI will also have the AN identity)

The PDSN keeps a UATI-IP address mapping

In another aspect, for an AT-terminated data call (routing of wake up message), functionality may be similar to what has been described previously, except for the following differences:

The PDSN routes the wake up message to an appropriate AN based on the "IP address to UATI mapping"

Figure 9:
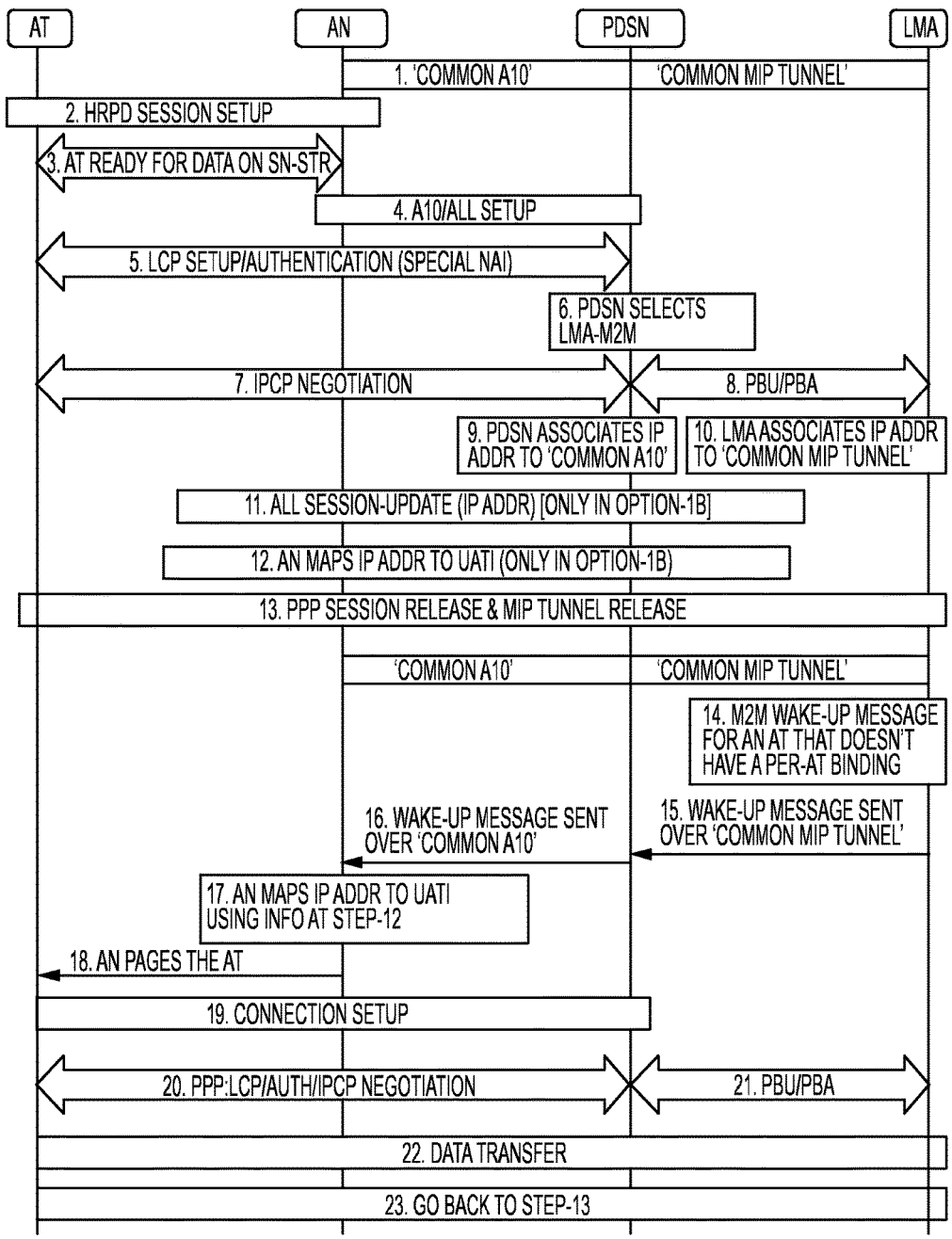
FIG. 9 illustrates an example sequence diagram for option 1 with data registration using PMIPv6.

The PDSN sends the UATI in the A10 attribute to the AN, which is used by the AN to page the AT FIG. 9 illustrates an example sequence diagram for option 1 with data registration using PMIPv6. FIG. 9 shows process and signaling interchanges among the access terminal (AT), the access node (AN), the packet data serving node (PDSN) and the local mobility agent (LMA). In one aspect, a common A10/MIP tunnel is reserved for wake up messages to the AT.

One example of data session registration according to option 1 includes various actions or messages exchanged between the AT 16 (see FIG. 1), the AN 42, PDSN 44 and HA/LMA 46. In step 1, common connections 24 are reserved for message 32. In step 2, a radio link layer session and corresponding AT-specific context are established. In steps 3-8, a data link layer session and IP network layer session and corresponding AT-specific contexts are established (e.g., in a PPP session setup). In step 3, the term "SN-str" stands for HRPD Stream bound to Packet-Data-Service Network. In step 5, a special indicator (e.g., a special network address identifier (NAI) or a special signaling option) is utilized to indicate to the network elements to associate the network identifier (e.g., IP address) with the common connection 24 and to maintain the network identifier even if the PPP session is released. Also, in step 8, PBU/PBA stands for proxy binding update/proxy binding acknowledgement. Accordingly, in steps 9 and 10, the PDSN and the HA/LMA respectively associate the network identifier to their corresponding common connection 24 (e.g., to the common A10 connection and the common MIP tunnel, respectively). Optionally, with respect to option 1b, in step 11, a session update message is used to update the network identifier, such that in step 12 the AN maps the network identifier to a terminal identifier, such as the UATI. In step 13, the AT-specific PPP session and MIP tunnel are released, thus freeing up network resources.

One example of establishing a connection to carry an AT terminated call according to option 1 includes step 14, where the HA/LMA receives message 32 (e.g., the wake up message) which is transmitted over the common connections 24 (e.g., the common MIP tunnel and the common A10 connection) in steps 15 and 16. Further, the AN 42 pages the AT 16 at step 18. And, step 17 may optionally occurs with the mechanism of option 1b, and that also, optionally, the PDSN 44 may map the network identifier to the terminal identifier between steps 16 and 17 with the mechanism of option 1c. Additionally, it should be understood that each network element, (e.g., AN 42, PDSN 44, HA/LMA 46) may support a plurality of ATs 16 and/or M2M devices. Thus, each network element may have a mapping correlating an address in a received message to a next network element which may allow each network element to determine which next network element the message should be transmitted.

Continuing to steps 19-21, based on the page, the AT 16 initiates establishing an AT-specific connection having corresponding AT-specific contexts, and data transfer is performed at step 22. Subsequently, step 23 returns the flow to step 13, where the AT-specific PPP session and the MIP tunnel are released and freeing up network resources.

In one example, for mobility (e.g., an inter-AN mobility), a target AN and PDSN may include a context setup. The AT may set up a HRPD/PPP session when it moves to a new subnet. To avoid a ping-pong effect between setting up on new targets, e.g., when at an edge of AN coverage, a timer may be defined by the PDSN and communicated through an IP control protocol vendor specific option (IPCP VSO) or an LCP vendor specific packet or any link layer signaling. In another example, a source AN and PDSN may include a cleanup procedure. For example, there may be a context cleanup for the AN where during an inter-AN handoff, the PDSN sends an A11-Session-Update message to an old AN to clean up the IP address entry (if it is stored). For example, there may be a context cleanup for the PDSN which may be timer based, may use a basic rate interface (BRI) (on a common tunnel) to disassociate the IPv6 address, and/or may delete an A10/A11 connection by the AN when the AT closes the HRPD session and the AT moves to a new AN in a new PDSN).

For example, for M2M-service deregistration, an IP address may be released after deregistration with the M2M server. For example, in a M2M server-initiated deregistration, an IP address may be released after deregistration with the M2M server. In one example, for M2M server-initiated deregistration, the M2M server or local mobility anchor (LMA) may send a M2M: de-registration message to the AT using a common MIP/A10 tunnel to initiate release of the IP address. In another example, for AT-initiated deregistration, a M2M client application in the AT may signal to the M2M server to deregister and an IP address release procedure may be performed (e.g., adding a new VSO in the IP control protocol (IPCP) and a new information element in a proxy binding update/proxy binding acknowledgment (PBU/PBA) message.

In one aspect, option 1 may include mobility considerations, for example, inter-AN mobility and M2M server deregistration considerations. The AT 16 may be configured to initiate a new context setup on a target AN and PDSN when AT moves into a new area or subnet served by the target AN. In one aspect, the AT or the AN may be provided with a timer, which may be defined by PDSN, to avoid repeating initiating new target setup procedures, such as when the AT is at an edge of a coverage area of two ANs. Furthermore, one or more of the elements, such as PDSN, may include an AN context clean-up functionality. For example, during an inter-AN handoff procedure, the PDSN may send a session update message to an old AN to trigger clean up or deletion of the network identifier if it is stored by the AN. Additionally, one or more network elements may include PDSN context clean-up functionality. For example, the PDSN context clean-up may be timer based, such that after a time period (e.g., without AT call activity), the clean-up procedure is automatically initiated. A binding revocation message (e.g., basic rate interface (BRI)) may be sent (e.g., on a common tunnel) to disassociate a network identifier (e.g., IPv6 address). Further, the AN may perform a PDSN context deletion (e.g., an A10/A11 deletion) when the AT closes the radio link layer session (e.g., HRPD session) and moves to a new AN in a new PDSN.

The M2M server deregistration functionality releases the network identifier (e.g., IP address) after an AT deregistration with the M2M server. In one aspect, the deregistration may be M2M server initiated. In another aspect, the deregistration may be AT initiated. At the time of M2M deregistration, the IP address associated with the device is deleted.

In one example, for an air interface, there may be a new paging cycle to allow a larger sleep duration as an option. For an interoperability specification (IOS): a) there may be a dedicated common A10 interface; b) there may be a new A10 attribute which includes the IP address or the UATI of the AT (e.g., for options 1a, 1b or 1c); c) there may be added A11 signaling (AN to PDSN) to update the PDSN about the UATI for the AT (for option 1c); and/or d) there may be added A11 signaling (PDSN to AN) to update the AN about the IP address of the AT. In another example, for a PDSN, there may be a dedicated MIP tunnel, a dedicated A10 connection, a special network access identifier (NAI) (optional), and/or a vendor specific option in IPCP for passing a hysteresis timer to avoid a ping-pong effect at an inter-AN boundary. In another example, for a local mobility anchor (LMA), there may be a M2M application server integrated with the LMA or there may be a per-AT M2M registration/deregistration procedure.

For a second model option (option 2), a per-AT context is allocated only at an AT and M2M server wherein a HRPD session and a PPP session are not maintained. In one example, a paging procedure based on an IP address may be used to wake up the AT. In one aspect, the PDSN sends an IP address of the AT to the AN as an A10 attribute. In another aspect, a common A10/mobile IP tunnel is reserved for wakeup messages.

In option 2, a per-AT context 22 (shown in FIG. 1) is allocated only at the AT 16 and the call originator gateway component 14 (a.k.a. for this case as a M2M server). For example, both a PPP session and a radio link layer (e.g., HRPD session) are not maintained. For example, message 32 includes IP address based paging to wake up the AT 16. For example, the packet data serving node (PDSN) 44 sends the IP address of the AT 16 to the AN 42 as an A10 message attribute. And, the common connection 24 may be reserved for the message 32. For example, the common connection 24 may include an A10 connection between the AN 42 and the PDSN 44, and a mobile IP (MIP) tunnel between PDSN 44 and mobility element 46 (e.g., home agent/local mobility agent (HA/LMA)).

In one example, option 2 may be summarized by the following steps. Steps 1-3 relate to a data session registration for the AT to obtain an IP address and to register the IP address with the M2M server/gateway. Steps 4-7 relate to establishing an AT terminated data call or connection.

1. The AT initiates a data session; The IPv6 address is allocated
2. The allocated IP address is registered with the M2M server
3. The PPP session and the HRPD session are closed; the IP address is maintained at the AT and the M2M server/gateway
4. The M2M server sends a wake-up message to the AT with the allocated IP address; a common MIP tunnel is used to send the wake-up message
5. The PSDN sends a wake-up message to the AN using a common A10 connection
6. The AN sends an IP Page message to the ATs, for example, using a special access terminal identifier/mobile access terminal identifier (ATI/MATI)) that addresses a group of ATs. The special ATI/MATI may be received by many ATs. A special indicator in the page message may indicate to the AT that an IP address is used to identify the AT, which may need to be examined by the AT to determine if the page is directed to that AT. In another aspect, a URL may be included in the page message to identify the AT at the HRPD air interface.
7. The AT sets up a high rate packet data (HRPD) session and a Point-to-Point Protocol (PPP) session; data transfer commences In step 1, the AT initiates a data session (e.g., a connection), for example at power-up, to establish AT-specific contexts including an radio link layer context (e.g., HRPD context), a data layer link, and IP layer content (e.g., PPP context). And, in step 1, the network identifier 12 (e.g., an IP address) is allocated. In step 2, the network identifier 12 is registered with the M2M server. In step 3, the PPP session and the radio link layer session (e.g., HRPD) are both closed, thereby causing deletion of the corresponding AT-specific contexts, while maintaining the network identifier 12 at the AT 16 and M2M server. In one example, no AT-specific contexts are maintained, as opposed to the disclosure regarding option 1 which maintains the radio link layer AT-specific context (e.g., HRPD context).

In step 4, the M2M server sends a message 32 (e.g., a wake up message) to the AT 16 using the network identifier 12 (e.g., IP address) via a common connection 24 (e.g., MIP tunnel). In step 5, the PDSN 44 sends the message 32 to the AN 42 using a common connection 24 (e.g., A10 connection). In step 6, the AN 42 uses network identifier 12 (e.g., IP address) in the message 32 to send an IP page message. The IP page message may optionally include a special UATI, a mobile ATI (MATI) or a broadcast ATI (BATI) to include part of the IP address in the page. In step 7, the AT 16 establishes a specific connection, such as establishes a radio link layer (e.g., a HRPD session and a PPP session) having AT-specific contexts to support the AT terminated call; data transfer ensues.

Figure 10:
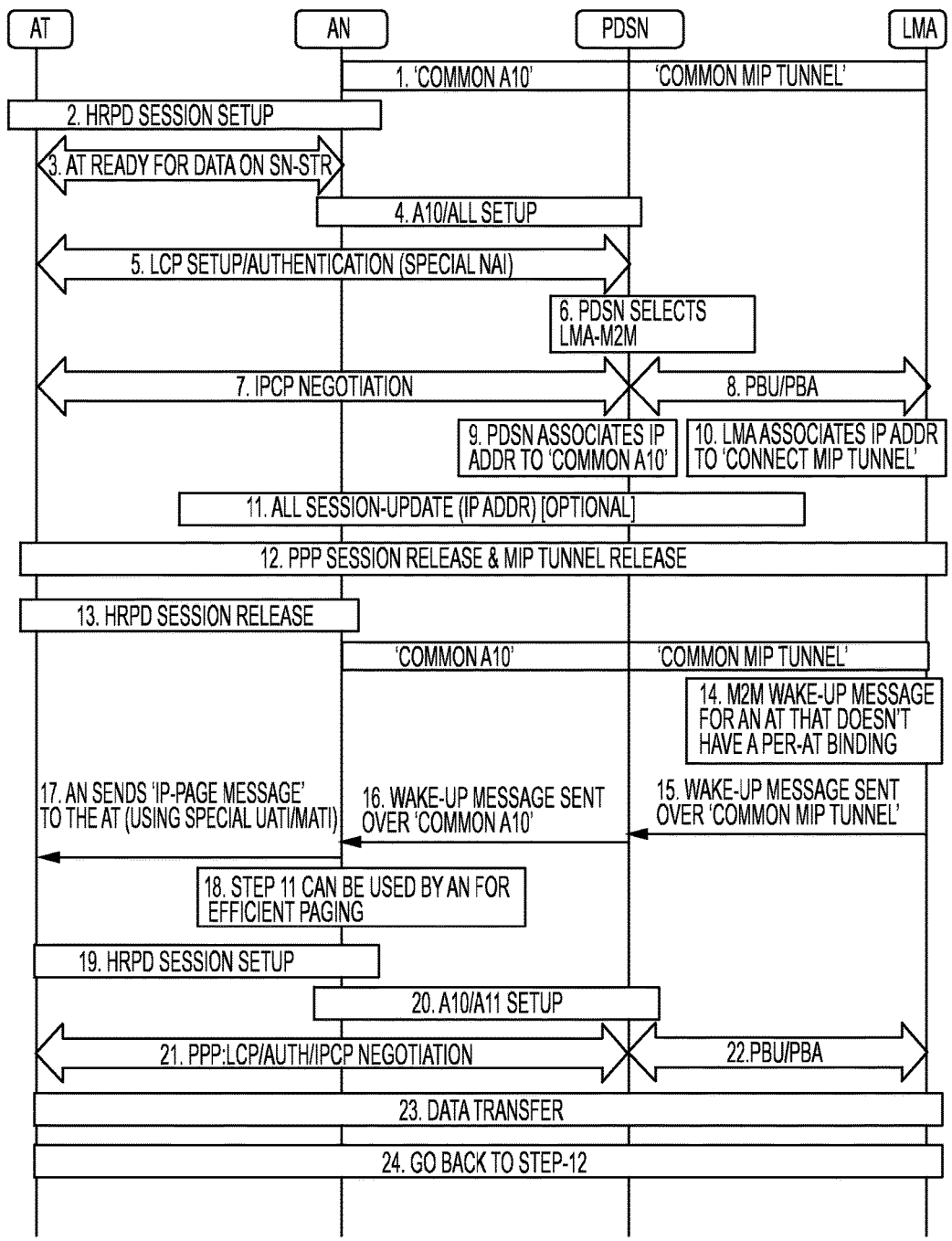
FIG. 10 illustrates an example sequence diagram for option 2 with data registration using PMIPv6.

FIG. 10 illustrates an example sequence diagram for option 2 with data registration using PMIPv6. FIG. 10 shows process and signaling interchanges among the access terminal (AT), the access node (AN), the packet data serving node (PDSN) and the local mobility agent (LMA). In one aspect, a common A10/MIP tunnel is reserved for the wake up messages to the AT.

One example includes various actions or messages which are exchanged between AT 16, AN 42, PDSN 44 and HA/LMA 46. In one example, steps 1-11 are the same as steps 1-11 in Option 1. Step 12 corresponds to step 13 in option 1. Optionally, step 11 may be performed to update the session. In an aspect, in step 11, the session update may include the AN associating a sector identifier of the respective sector with which the AT is in communication with the network identifier (e.g., the IP address) so that upon receiving the wake up message, the AN will know which base station (a.k.a. base transceiver station (BTS)) to page. Further, in step 13, option 2 differs from option 1, in that the radio link layer context (e.g., the HRPD session) is released. There is no mapping of the network identifier (e.g., IP address) to the UATI at the AN. Instead, an IP based paging is utilized.

Steps 14-17 and 21-24 essentially correspond to steps 14-16, 18 and 20-23, respectively, in option 1. Option 2 differs from Option 1, however, in a number of respects. For example, in option 2, in step 17, a network identifier-based page (e.g., an IP address-based page) is sent to the AT. Optionally, the page may include a special UATI/MATI. In another option, referring to step 18, the AN may determine the sector information associated with the AT as stored in step 11 to selectively page the AT at a selected BTS rather than flooding all the BTSs associated with the AN with the page. As an option, step 18 may be performed between steps 16 and 17. In step 19, establish a radio link layer context (e.g., an HRPD session) as the prior radio link layer context was released in step 13. Further, the data link layer and IP contexts (e.g., the PPP session) is re-setup in steps 20-22. Data transfer subsequently occurs in step 23. In step 24, return to step 12 where the data link layer and IP contexts (e.g., the PPP session) are released. In step 13, the radio link layer context (e.g., HRPD session) is also released.

In one example, either an IPv4 or an IPv6 address may be used. In another example, one of a Simple IP, a Proxy Mobile IP or a Client Mobile IP may be used as a possible protocol. In another example, a data session registration procedure, similar to option 1b except that a HRPD session and UATI are released after an IP address allocation procedure, may be used. In yet another example, use an AT-terminated data call with routing of a wake up message, similar to option 1b except that the AN may use an IP address obtained in an A10 attribute to page the AT and the AT may set up a HRPD session in response to receiving the page with an IP address.

In another aspect, for mobility considerations (e.g. an AT moving across AN boundaries), include-a context transfer where the AT associates an IP address with a subnet and the AT may set up a HRPD/PPP session when the AT moves to a new subnet. For example, to avoid a ping-pong effect, a timer may be defined by the PDSN and communicated through an IP control protocol vendor specific option (IPCP VSO). In another example, include a clean up procedure (e.g., during mobility). The clean up procedure may include a M2M deregistration/IP address release, where a M2M client application in the AT signals to a M2M server in the LMA to deregister and the IP address is released. And, add a VSO in an IPCP and add a new information element in a proxy binding update/proxy binding acknowledgement (PBU/PBA). In another example, the clean up procedure may include an AN context cleanup where during inter-AN handoff/M2M deregistration, the PDSN sends an A11 Session-Update message (for a common A10 connection) to an old AN to clean up IPv6 (e.g., if it is stored). In another example, the clean up procedure may include a PDSN context clean up which is timer based and includes a basic rate interface (BRI) (e.g., on a common tunnel) to disassociate IPv6 addresses. In another aspect, include an IP address revocation by a M2M server or LMA where the M2M server or LMA sends a M2M: De-Registration message to the AT using a common mobile IP (MIP)/A10 tunnel.

Several system impacts to the system elements may occur with regards to option 2. In one example, an air interface transmits a news bit indicating that the AN is capable of supporting an IP-Page message. The IP-Page message may include an optional extension of a special unicast/multicast/broadcast AT identifier (UATI/MATI/BATI) to include part of an IP address. In one example, to further reduce the number of bits, a last number of bits of the IP address may be used for either an IPv6 prefix or an IPv4 address. And, a new paging cycle to allow a longer sleep duration may be used.

In another example, for an interoperability specification (IOS), a dedicated common-A10 connection may be used and a new A10 attribute which includes an IP address for an AT may be added.

In another example, for a packet data serving node (PDSN), a dedicated MIP tunnel may be used and a special network access identifier (NAI) may optionally be used. In another example, a VSO in IPCP for passing a hysteresis timer to avoid a ping-pong effect at an inter-AN boundary may also be used. In another example, for a local mobility anchor (LMA), a M2M application server may be integrated with the LMA.

In another aspect, for a mobile IP version 6/dual stack (DS) mobile IP version 6 (MIPv6/DSMIP6) based solution, a high rate packet data (HRPD) may not use MIPv6. In one example, some HRPD vendors choose PMIP6 for the IPv6 mobility. The following proposed solution may be used if MIPv6/DSMIP6 is deployed.

Figure 11:
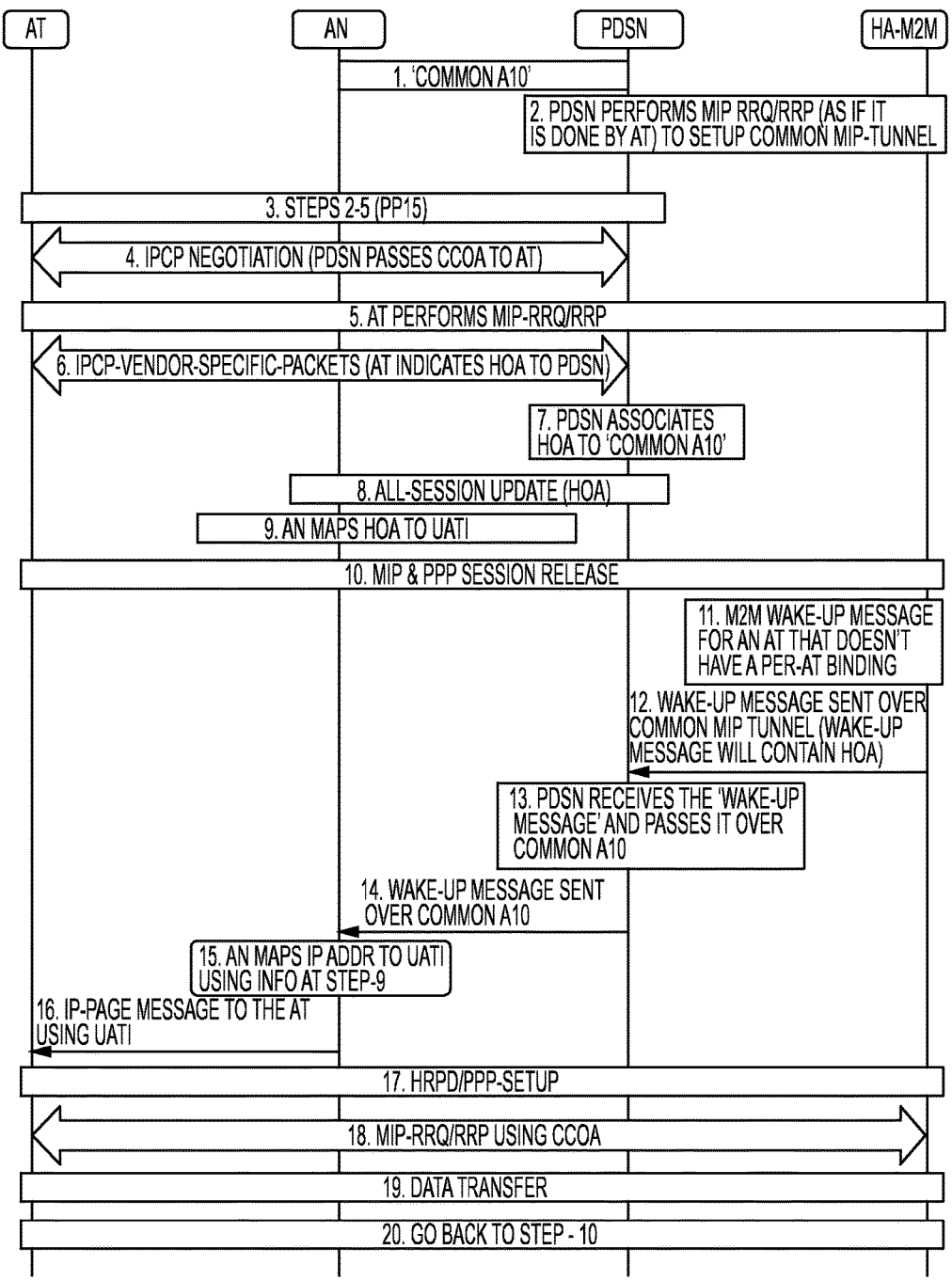
FIG. 11 illustrates an example sequence diagram for data session registration using MIP6.

FIG. 11 illustrates an example sequence diagram for data session registration using MIP6. Shown is method of data session registration and of establishing a connection to carry an AT-terminated call.

Figure 12:
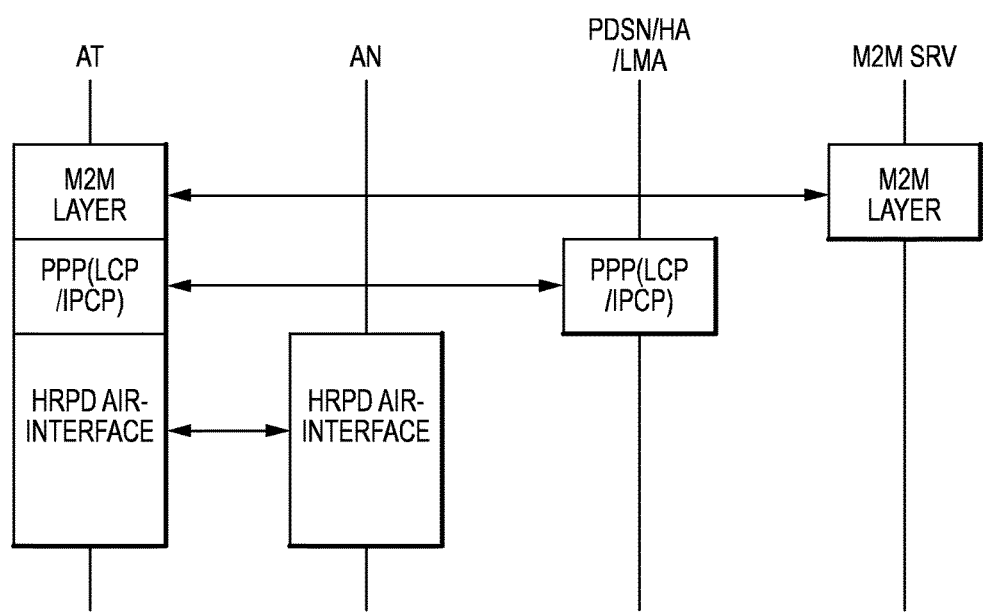
FIG. 12 illustrates an example sequence diagram for a M2M signaling protocol structure during setup.

FIG. 12 illustrates an example sequence diagram for a M2M signaling protocol structure during setup. Illustrated in FIG. 12 are protocol layers at various components which interface with each other during setup or registration. In one example, per-AT IP registration context is established using PPP/MIP. In one example, an IP address is kept at a M2M layer. In one example, a PPP/MIP context and a HRPD session may be released later.

Figure 13:
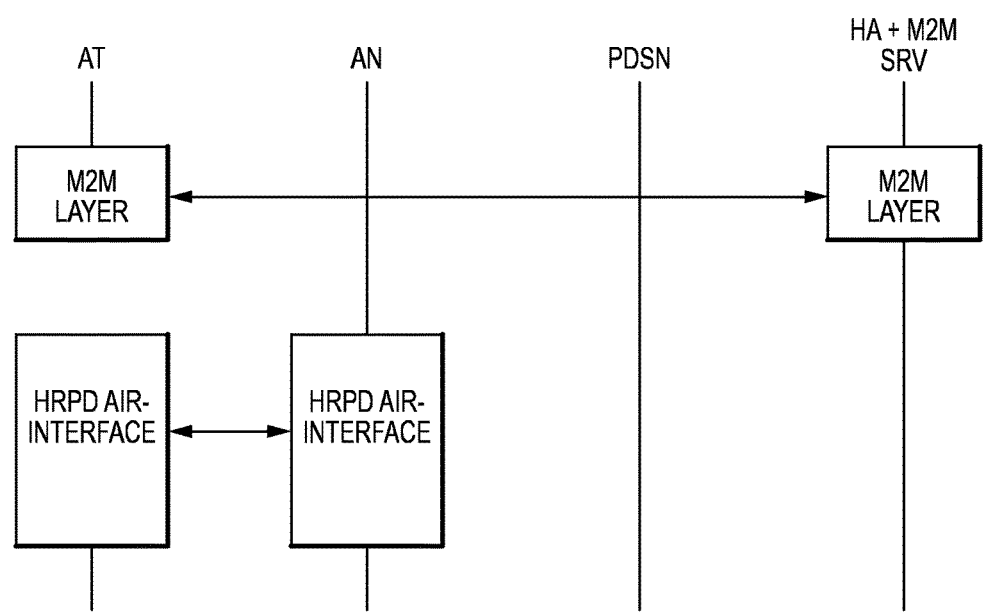
FIG. 13 illustrates an example sequence diagram for a M2M signaling protocol structure for establishing contexts.

FIG. 13 illustrates an example sequence diagram for a M2M signaling protocol structure for establishing contexts. Illustrated in FIG. 13 are protocol layers at various components which interface with each other for establishing contexts, referred to during AT terminated connection establishment. In one example, per-AT IP registration context is established using PPP/MIP. In one example, an IP address is kept at a M2M layer. In one aspect, if a HRPD session is not maintained, an IP address maintained at the M2M layer may be used to page the AT by an HRPD air interface. In another aspect, if an HRPD session is maintained, an AN maps an IP address to the UATI and uses the UATI to page the AT.

In another example, the previously described architectures as described, for example, in option 1 and option 2, may be modified to include a direct connection between the AN and the HA/LMA. In one aspect, this optional modification corresponds to direct common connection 30. In such an aspect, the context previously maintained at the PDSN 44 may be eliminated, as direct common connection bypasses the PDSN 44. Further, in an aspect, direct common connection 30 may include, but is not limited to, an IP-in-IP tunnel. As such, in this aspect, a first IP node or hop from call originator/gateway 14, or M2M server, may maintain at least a portion of the AT-specific context, and direct common connection 30 leads to a second IP node of hop, (e.g., AN 42) which also maintains at least a portion of the AT-specific context.

In another aspect, instead of maintaining a network identifier (e.g., IP address) or if the network identifier does not exist, the present disclosure may be modified such that a network address identifier (NAI) corresponding to the AT 16 or UE is used by the AN 42 to page the AT 16.

In another aspect, the options described herein may include one or more M2M messages including, but not limited to, a wake up message, a M2M deregistration message, and/or an M2M registration message. Further, in an aspect, an M2M message format may include a first field identifying the AT network identifier, a second field identifying a group identifier associated with the AT, wherein the group identifier identifies a class of the M2M device, and a third field identifying an option code (Opcode) or a message identifier (Message ID) to identify a type of the M2M message. For example, the M2M deregistration message may be exchanged between the AT and the M2M server when the M2M registration is to be released. In another example, the M2M registration message (from the AT to the M2M server) may be exchanged between the AT and the M2M server to hold the IP address even after a per-AT binding is released.

In another aspect, the present disclosure may be advantageous as compared to paging the AT using a short message service, such as a 1x-SMS, as use of SMS-based paging would further entail acquiring an international mobile subscriber identity (IMSI) for the respective device, and IMSI resources may be limited. Further, the present disclosure may be advantageous as compared to SMS paging as SMS pages may be delayed depending on loading, and short message service centers (SMSCs) are often overloaded. In one example, mobile operators may be moving to use an IP multimedia subsystem (IMS) based or IP based SMS whenever packet data is available.

Figure 14:
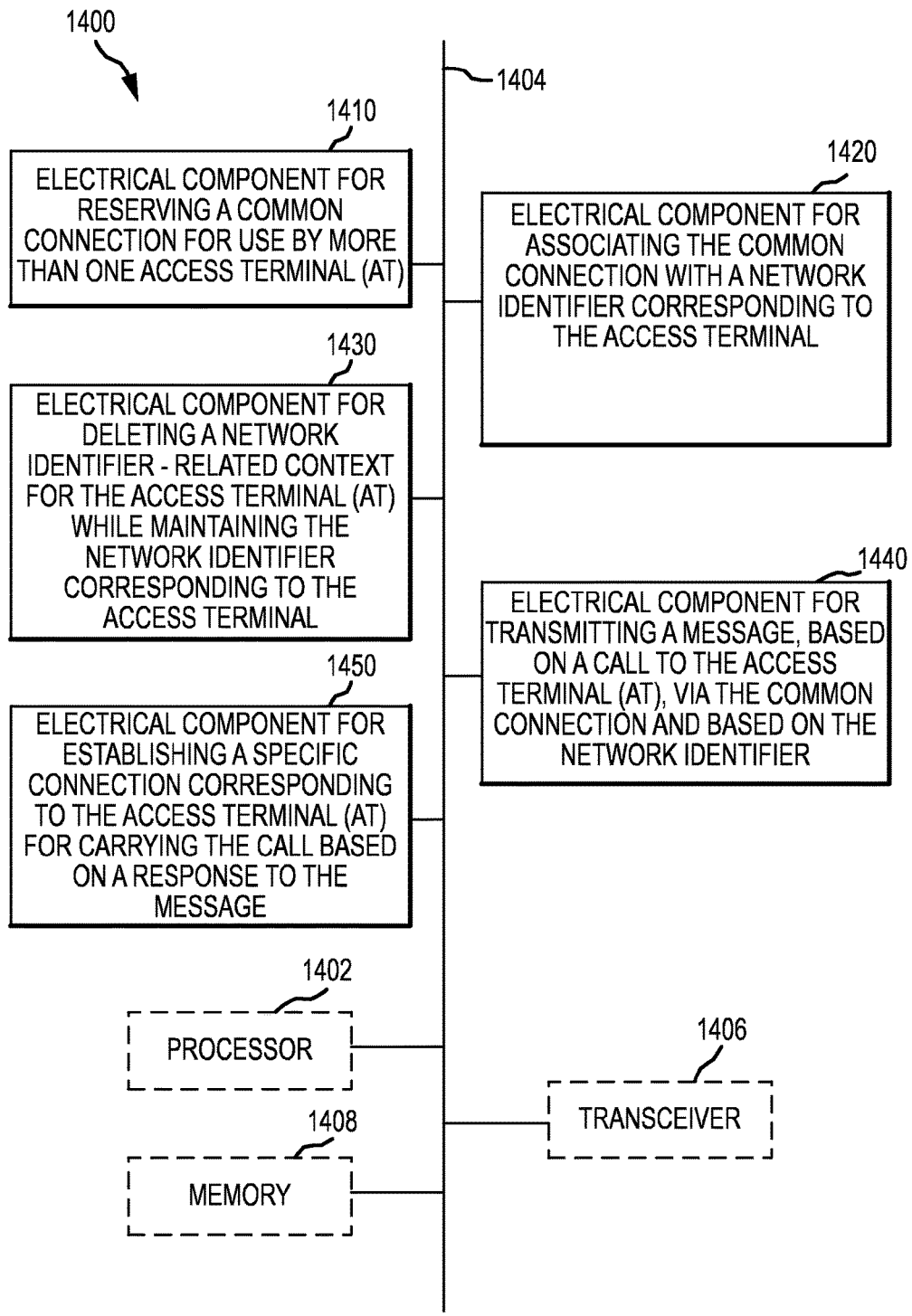
FIG. 14 illustrates an example device for establishing a connection in a wireless communications network.

FIG. 14 illustrates an example device 1400 for establishing a connection in a wireless communications network. The device 1400 may be configured as a communication device or as a processor or similar device for use within the communication device. As depicted, device 1400 may include functional blocks that can represent functions implemented by a processor, software, hardware or combination thereof (e.g., firmware).

As illustrated, device 1400 may include an electrical component 1410 for reserving a common connection for use by more than one access terminal (AT). The device 1400 may include an electrical component 1420 for associating the common connection with a network identifier corresponding to the access terminal. In one example, the association is based on a registration session by an access terminal. In one example, the AT establishes a radio link layer session, a data link layer session and/or an IP network layer session to obtain a network identifier to identify the AT in the wireless communications network. In one example, also register the obtained network identifier with an entity that desires to contact the AT, such as but not limited to one or more of a call originator gateway, or an M2M server. The device 1400 may include an electrical component 1430 for deleting a network identifier-related context for the access terminal (AT) while maintaining the network identifier. In one variation, the electrical component 1430 may be configured for deleting an Internet Protocol (IP)-related context and PPP context for the access terminal (AT) while maintaining the IP address corresponding to the access terminal. The device 1400 may include an electrical component 1440 for transmitting a message, based on a call to the access terminal (AT), via the common connection and based on the network identifier. The device 1400 may include an electrical component 1450 for establishing a specific connection corresponding to the access terminal (AT) for carrying the call based on a response to the message. In one example, the electrical component 1450 is configured for establishing a specific connection and a context for the network-identifier corresponding to the AT for carrying the call based on a response to the message.

Device 1400 may optionally include a processor module 1402 having at least one processor. In one aspect, device 1400 may be configured as a communication network entity, rather than as a processor. Processor 1402, in such case, may be in operative communication with electrical components 1410-1450 via a bus 1404 or a similar communication coupling. Processor 1402 may effect initiation and scheduling of the processes or functions performed by electrical components 1410-1450.

In related aspects, device 1400 may include a transceiver module 1406. A stand-alone receiver and/or stand-alone transmitter may be used in lieu of or in conjunction with transceiver module 1406. In further related aspects, device 1400 may optionally include a module for storing information, such as, for example, a memory module 1408. The memory module 1408 may include a computer readable medium and may be operatively coupled to the other components of device 1400 via a bus 1404 or the like. The memory module 1408 may be adapted to store computer readable codes, instructions and/or data for effecting the processes and behavior of electrical components 1410-1450, and subcomponents thereof, or processor 1402, or the methods disclosed herein. Memory module 1408 may retain codes/instructions for executing functions associated with electrical components 1410-1450. While shown as being external to memory module 1408, it is to be understood that electrical components 1410-1450 may exist within memory module 1408.

Figure 15:
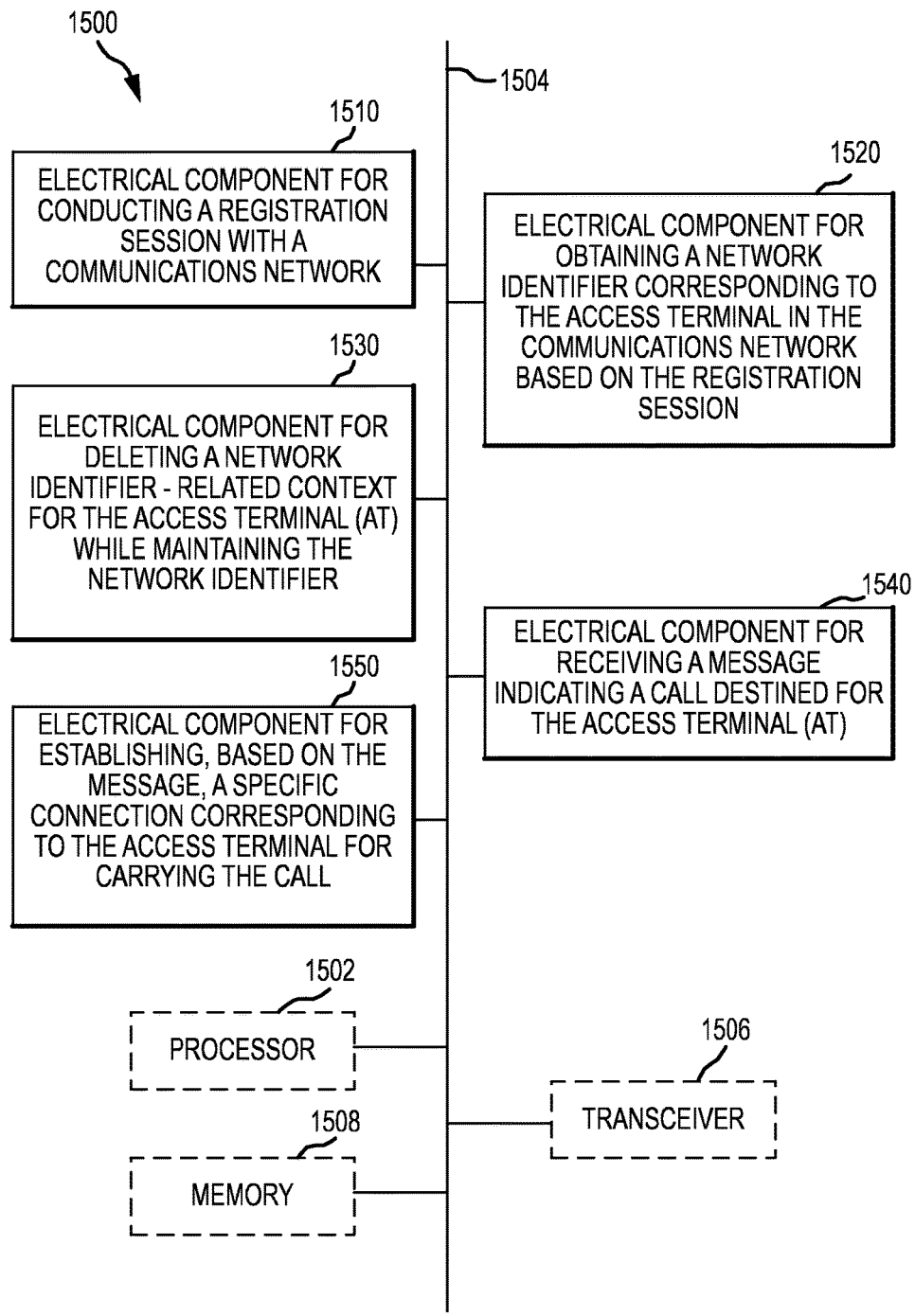
FIG. 15 illustrates an example device for establishing a connection in an access terminal (AT).

FIG. 15 illustrates an example device 1500 for establishing a connection in an access terminal (AT). The device 1500 may be configured as a communication device or as a processor or similar device for use within the communication device. As depicted, device 1500 may include functional blocks that can represent functions implemented by a processor, software, hardware or combination thereof (e.g., firmware).

As illustrated, device 1500 may include an electrical component 1510 for conducting a registration session with a communications network. The device 1500 may include an electrical component 1520 for obtaining a network identifier corresponding to the access terminal in the communications network based on the registration session. The device 1500 may include an electrical component 1530 for deleting a network identifier-related context for the access terminal (AT) while maintaining the network identifier. In one variation, the electrical component 1530 may be configured for deleting an Internet Protocol (IP)-related context for the access terminal (AT) while maintaining the network identifier. The device 1500 may include an electrical component 1540 for receiving a message indicating a call destined for the access terminal (AT). The device 1500 may include an electrical component 1550 for establishing, based on the message, a specific connection corresponding to the access terminal for carrying the call.

Device 1500 may optionally include a processor module 1502 having at least one processor. In one aspect, device 1500 may be configured as a communication network entity, rather than as a processor. Processor 1502, in such case, may be in operative communication with electrical components 1510-1550 via a bus 1504 or a similar communication coupling. Processor 1502 may effect initiation and scheduling of the processes or functions performed by electrical components 1510-1550.

In related aspects, device 1500 may include a transceiver module 1506. A stand-alone receiver and/or stand-alone transmitter may be used in lieu of or in conjunction with transceiver module 1506. In further related aspects, device 1500 may optionally include a module for storing information, such as, for example, a memory module 1508. The memory module 1508 may include a computer readable medium and may be operatively coupled to the other components of device 1500 via a bus 1504 or the like. The memory module 1508 may be adapted to store computer readable codes, instructions and/or data for effecting the processes and behavior of electrical components 1510-1550, and subcomponents thereof, or processor 1502, or the methods disclosed herein. Memory module 1508 may retain codes/instructions for executing functions associated with electrical components 1510-1550. While shown as being external to memory module 1508, it is to be understood that electrical components 1510-1550 may exist within memory module 1508.

One skilled in the art would understand that the steps disclosed in the example flow diagrams in FIGS. 3 and 4 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art. In one aspect, the computer-readable medium includes non-transitory computer-readable medium.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 16:
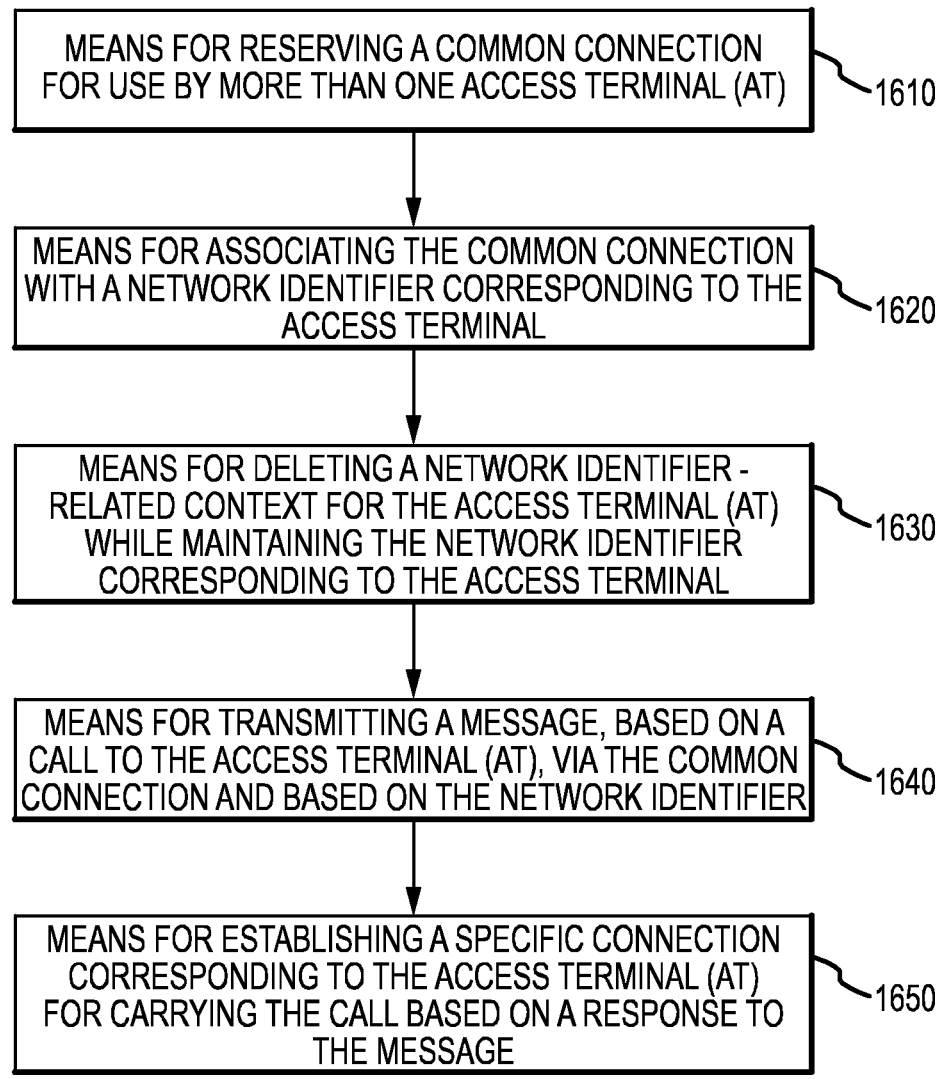
FIG. 16 illustrates an example device suitable for establishing a connection in a wireless communications network.

FIG. 16 illustrates an example device 1600 suitable for establishing a connection in a wireless communications network. In one aspect, the device 1600 is implemented by at least one processor comprising one or more modules configured to provide different aspects of establishing a connection in a wireless communications network as described herein in blocks 1610, 1620, 1630, 1640 and 1650. For example, each module includes hardware, firmware, software, or any combination thereof. In one aspect, the device 1600 is also implemented by at least one memory in communication with the at least one processor.

Figure 17:
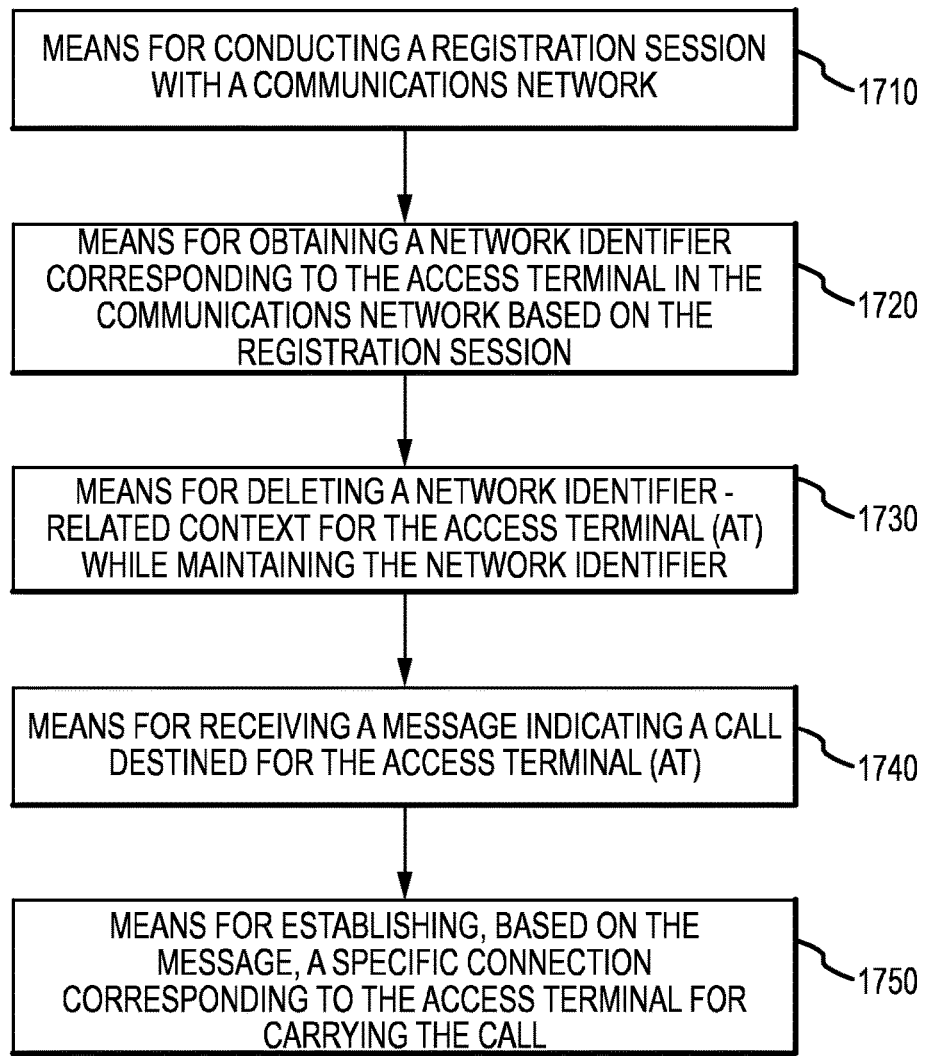
FIG. 17 illustrates an example device suitable for establishing a connection in a wireless communications network.

FIG. 17 illustrates an example device 1700 suitable for establishing a connection in a wireless communications network. In one aspect, the device 1700 is implemented by at least one processor comprising one or more modules configured to provide different aspects of establishing a connection in a wireless communications network as described herein in blocks 1710, 1720, 1730, 1740 and 1750. For example, each module includes hardware, firmware, software, or any combination thereof. In one aspect, the device 1700 is also implemented by at least one memory in communication with the at least one processor.

Figure 18:
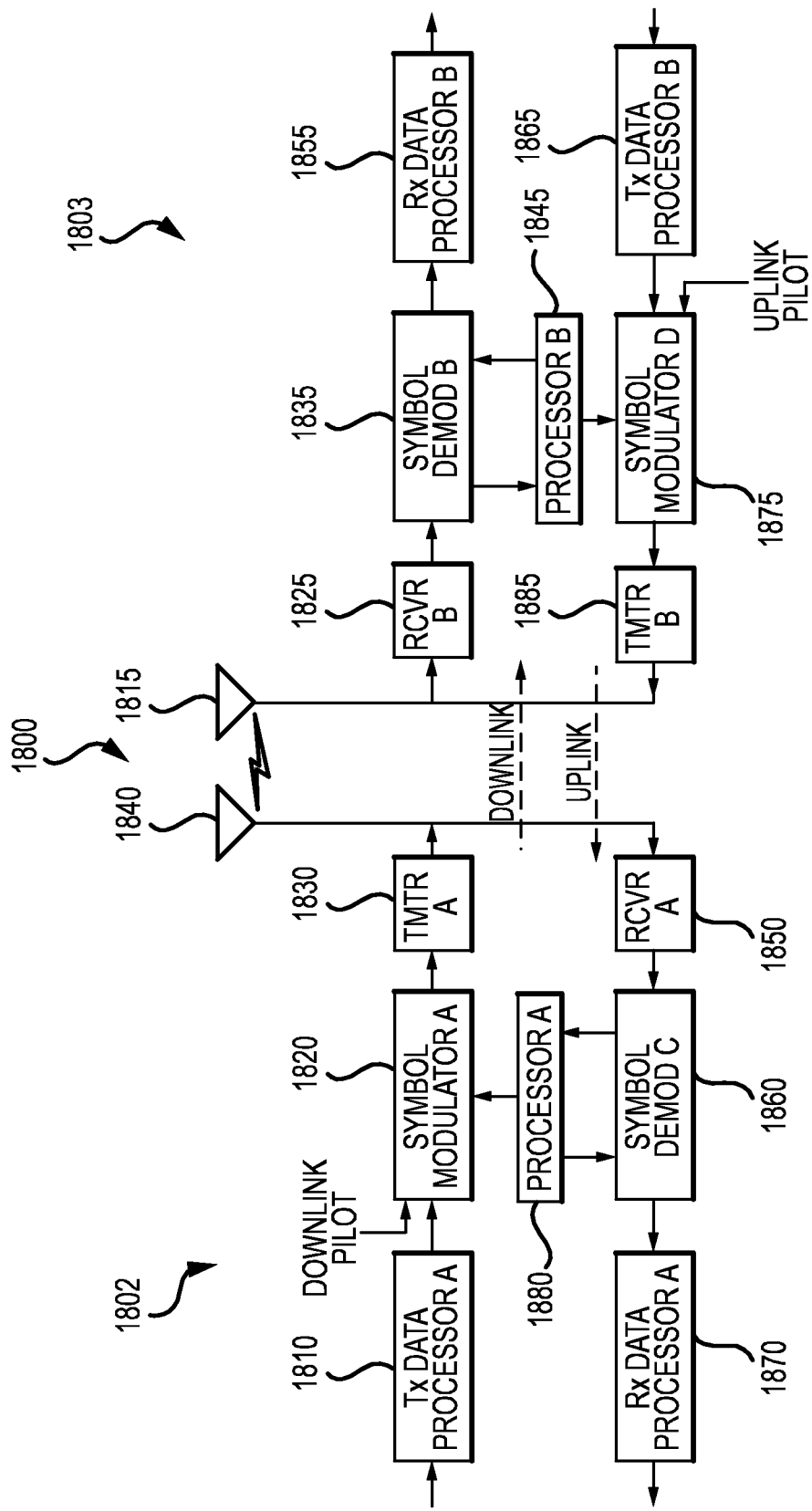
FIG. 18 is a block diagram illustrating an example of a two terminal system, for example, an access node/access terminal.

FIG. 18 is a block diagram illustrating an example of a two terminal system, for example, an access node/access terminal 1800. One skilled in the art would understand that the example access node/access terminal 1800 illustrated in FIG. 1 may be implemented in an FDMA environment, an OFDMA environment, a CDMA environment, a WCDMA environment, a TDMA environment, a SDMA environment or any other suitable wireless environment.

The access node/access terminal 1800 includes an access node 1802 (e.g., base station) and an access terminal (e.g., wireless communication device). In the downlink leg, the access node 1802 (e.g., base station) includes a transmit (TX) data processor A 1810 that accepts, formats, codes, interleaves and modulates (or symbol maps) traffic data and provides modulation symbols (e.g., data symbols). The TX data processor A 1810 is in communication with a symbol modulator A 1820. The symbol modulator A 1820 accepts and processes the data symbols and downlink pilot symbols and provides a stream of symbols. In one aspect, it is the symbol modulator A 1820 that modulates (or symbol maps) traffic data and provides modulation symbols (e.g., data symbols). In one aspect, symbol modulator A 1820 is in communication with processor A 1880 which provides configuration information. Symbol modulator A 1820 is in communication with a transmitter unit (TMTR) A 1830. The symbol modulator A 1820 multiplexes the data symbols and downlink pilot symbols and provides them to the transmitter unit A 1830.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 1830 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 1840.

In the downlink leg, the access terminal (AT) 1803 includes antenna 1815 for receiving the analog downlink signal and inputting the analog downlink signal to a receiver unit (RCVR) B 1825. In one aspect, the receiver unit B 1825 conditions, for example, filters, amplifies, and frequency downconverts the analog downlink signal to a first "conditioned" signal. The first "conditioned" signal is then sampled. The receiver unit B 1825 is in communication with a symbol demodulator B 1835. The symbol demodulator B 1835 demodulates the first "conditioned" and "sampled" signal (e.g., data symbols) outputted from the receiver unit B 1825. One skilled in the art would understand that an alternative is to implement the sampling process in the symbol demodulator B 1835. The symbol demodulator B 1835 is in communication with a processor B 1845. Processor B 1845 receives downlink pilot symbols from symbol demodulator B 1835 and performs channel estimation on the downlink pilot symbols. In one aspect, the channel estimation is the process of characterizing the current propagation environment. The symbol demodulator B 1835 receives a frequency response estimate for the downlink leg from processor B 1845. The symbol demodulator B 1835 performs data demodulation on the data symbols to obtain data symbol estimates on the downlink path. The data symbol estimates on the downlink path are estimates of the data symbols that were transmitted. The symbol demodulator B 1835 is also in communication with a RX data processor B 1855.

The RX data processor B 1855 receives the data symbol estimates on the downlink path from the symbol demodulator B 1835 and, for example, demodulates (i.e., symbol demaps), deinterleaves and/or decodes the data symbol estimates on the downlink path to recover the traffic data. In one aspect, the processing by the symbol demodulator B 1835 and the RX data processor B 1855 is complementary to the processing by the symbol modulator A 1820 and TX data processor A 1810, respectively.

In the uplink leg, the AT 1803 includes a TX data processor B 1865. The TX data processor B 1865 accepts and processes traffic data to output data symbols. The TX data processor B 1865 is in communication with a symbol modulator D 1875. The symbol modulator D 1875 accepts and multiplexes the data symbols with uplink pilot symbols, performs modulation and provides a stream of symbols. In one aspect, symbol modulator D 1875 is in communication with processor B 1845 which provides configuration information. The symbol modulator D 1875 is in communication with a transmitter unit B 1885.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 1885 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 1815.

The analog uplink signal from AT 1803 is received by antenna 1840 and processed by a receiver unit A 1850 to obtain samples. In one aspect, the receiver unit A 1850 conditions, for example, filters, amplifies and frequency downconverts the analog uplink signal to a second "conditioned" signal. The second "conditioned" signal is then sampled. The receiver unit A 1850 is in communication with a symbol demodulator C 1860. One skilled in the art would understand that an alternative is to implement the sampling process in the symbol demodulator C 1860. The symbol demodulator C 1860 performs data demodulation on the data symbols to obtain data symbol estimates on the uplink path and then provides the uplink pilot symbols and the data symbol estimates on the uplink path to the RX data processor A 1870. The data symbol estimates on the uplink path are estimates of the data symbols that were transmitted. The RX data processor A 1870 processes the data symbol estimates on the uplink path to recover the traffic data transmitted by the access terminal 1803. The symbol demodulator C 1860 is also in communication with processor A 1880. Processor A 1880 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 1880 and processor B 1845 direct (i.e., control, coordinate or manage, etc.) operation at the access node 1802 (e.g., base station) and at the AT 1803, respectively. In one aspect, either or both processor A 1880 and processor B 1845 are associated with one or more memory units (not shown) for storing of program codes and/or data. In one aspect, either or both processor A 1880 or processor B 1845 or both perform computations to derive frequency and impulse response estimates for the uplink leg and downlink leg, respectively.

In one aspect, the access node/access terminal 1800 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of ATs. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 19:
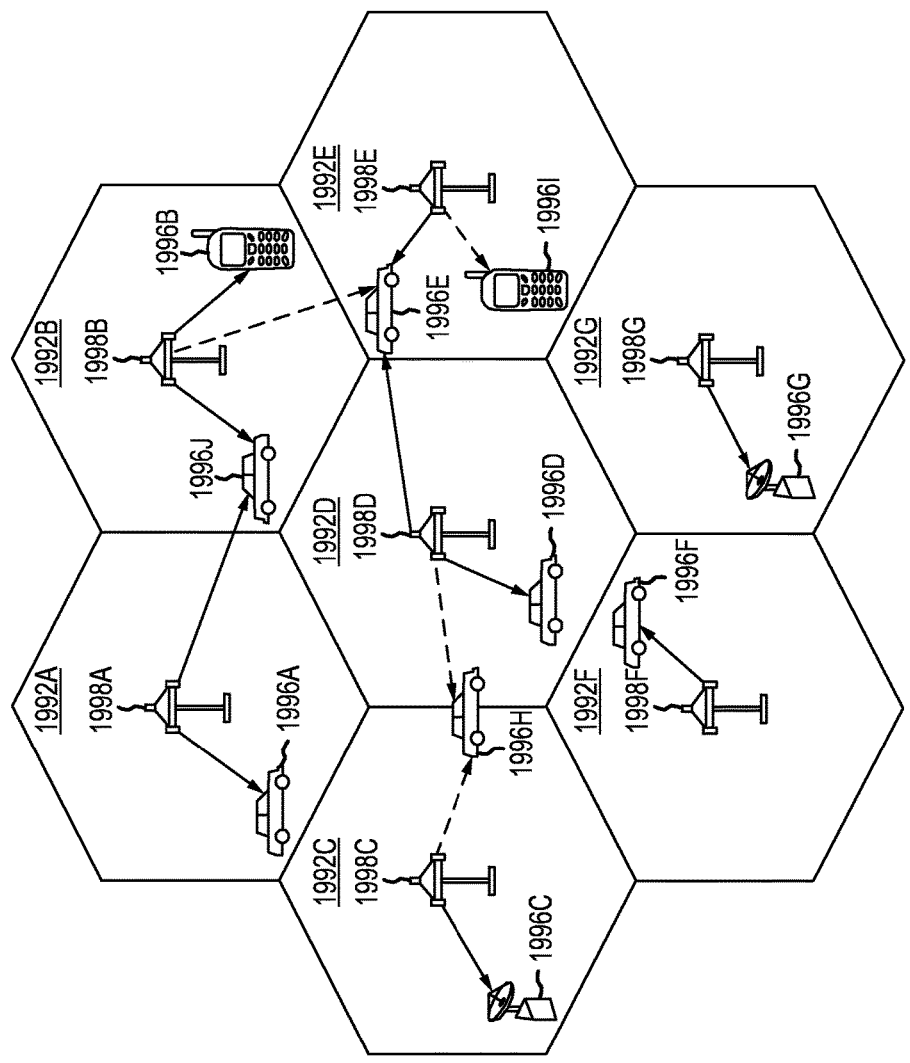
FIG. 19 illustrates an example of a wireless communications network that supports a plurality of access terminals.

FIG. 19 illustrates an example of a wireless communications network 1900 that supports a plurality of access terminals. In FIG. 19, reference numerals 1992A to 1992G refer to cells, reference numerals 1998A to 1998G refer to access nodes (a.k.a. base stations (BS), Node Bs, eNodeBs). Reference numerals 1996A to 1996J refer to access terminals (a.k.a. user equipment (UE), user devices, etc.). Cell size may vary. Any of a variety of algorithms and methods may be used to schedule transmissions in the wireless communications network 1900. The wireless communications network 1900 provides communication for a number of cells 1992A through 1992G, each of which is serviced by a corresponding access nodes 1998A through 1998G, respectively.

One skilled in the art would understand that the scope and spirit of the present disclosure are not affected by other examples of radio access technologies employed by other wireless systems, including but not limited to, UMTS, WCDMA, GSM, GSM/GPRS/EDGE, LTE, IS-95, CDMA2000, EVDO or UMB, etc.

As used in the present disclosure, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution and a component may be localized on one computer and/or distributed between two or more computers. In addition, these components may execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal may also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, an eNodeB or some other similar terminology.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for establishing a connection in a communications network comprising:

reserving a common connection for use by an access terminal (AT) while deleting one or more AT-specific contexts associated with the AT when the AT is not in an active call or data connection, wherein the AT is one of a plurality of ATs reserving the common connection, wherein the common connection is an A10 connection established between an access node (AN) and a packet data switching node (PDSN), wherein the common connection includes a common mobile Internet Protocol (MIP) tunnel established between the PDSN and an Internet Protocol (IP) network-side element, and wherein the IP network-side element is one of a home agent (HA), a local mobility anchor (LMA), or a call originator gateway component;

associating the common connection with a network identifier corresponding to the AT for reaching the AT, wherein the associating is performed based on a registration session by the AT; and transmitting a message, based on a call to the AT, via the common connection and based on the network identifier, wherein a specific connection and a context for the network identifier corresponding to the AT for carrying the call are established based on a response to the message.

2. The method of claim 1, wherein the registration session is one of a radio link layer session, a data link layer session, or an IP network layer session.

3. The method of claim 1, wherein the message is one of a wake up message, a page message, or a hierarchical message.

4. The method of claim 3 further comprising constructing a hierarchical Internet Protocol (IP) address for one or more of the wake up message, the page message, or the hierarchical message.

5. The method of claim 3, wherein the page message uses an air-interface paging with an IP address, an Universal Resource Locator (URL), or a network address identifier (NAI) as the network identifier.

6. The method of claim 1 further comprising deriving a Unicast Access Terminal Identifier (UATI) from an Internet Protocol (IP) address of a data packet header of the message.

7. The method of claim 1, wherein the message includes information on a mapping to convert the network identifier to a device-specific identifier.

8. The method of claim 7, wherein the device-specific identifier is a Unicast Access Terminal Identifier (UATI).

9. The method of claim 1, wherein the network identifier is an Internet Protocol (IP) address or a Universal Resource Locator (URL).

10. An apparatus for establishing a connection in a communications network comprising a processor and a memory, the memory comprising program code executable by the processor to perform:

reserving a common connection for use by an access terminal (AT) while deleting one or more AT-specific contexts associated with the AT when the AT is not in an active call or data connection, wherein the AT is one of a plurality of ATs reserving the common connection, wherein the common connection is an A10 connection established between an access node (AN) and a packet data switching node (PDSN), wherein the common connection includes a common mobile Internet Protocol (MIP) tunnel established between the PDSN and an Internet Protocol (IP) network-side element, and wherein the IP network-side element is one of a home agent (HA), a local mobility anchor (LMA), or a call originator gateway component;

associating the common connection with a network identifier corresponding to the AT for reaching the AT, wherein the associating is performed based on a registration session by the AT; and transmitting a message, based on a call to the AT, via the common connection and based on the network identifier, wherein a specific connection and a context for the network identifier corresponding to the AT for carrying the call are established based on a response to the message.

11. The apparatus of claim 10, wherein the registration session is one of a radio link layer session, a data link layer session, or an IP network layer session.

12. The apparatus of claim 10, wherein the message is one of a wake up message, a page message, or a hierarchical message.

13. The apparatus of claim 10, wherein the message includes information on a mapping to convert the network identifier to a device-specific identifier.

14. The apparatus of claim 13, wherein the device-specific identifier is a Unicast Access Terminal Identifier (UATI).

15. The apparatus of claim 10, wherein a specific connection and a context for the network identifier corresponding to the AT for carrying the call is established and is based on a response to the message.

16. The apparatus of claim 10, wherein the network identifier is an IP address or a Universal Resource Locator (URL).

17. An apparatus for establishing a connection in a communications network comprising:
  means for reserving a common connection for use by an access terminal (AT) while deleting one or more AT-specific contexts associated with the AT when the AT is not in an active call or data connection, wherein the AT is one of a plurality of ATs reserving the common connection, wherein the common connection is an A10 connection established between an access node (AN) and a packet data switching node (PDSN), wherein the common connection includes a common mobile Internet Protocol (MIP) tunnel established between the PDSN and an Internet Protocol (IP) network-side element, and wherein the IP network-side element is one of a home agent (HA), a local mobility anchor (LMA), or a call originator gateway component;
  means for associating the common connection with a network identifier corresponding to the AT for reaching the AT, wherein the associating the common connection is based on a registration session by the AT; and
  means for transmitting a message, based on a call to the AT, via the common connection and based on the network identifier, wherein a specific connection and a context for the network identifier corresponding to the AT for carrying the call are established based on a response to the message, wherein a specific connection and a context for the network identifier corresponding to the AT for carrying the call are established based on a response to the message.

18. The apparatus of claim 17, wherein the registration session is one a radio link layer session, a data link layer session, or an IP network layer session.

19. The apparatus of claim 17, wherein the message is one of a wake up message, a page message and a hierarchical message, and the message includes information on a mapping to convert the network identifier to a device-specific identifier.

20. The apparatus of claim 19, wherein the device-specific identifier is a Unicast Access Terminal Identifier (UATI).

21. The apparatus of claim 17, wherein the network identifier is an Internet Protocol (IP) address or a Universal Resource Locator (URL).

22. A non-transitory computer readable medium storing computer executable code for establishing a connection in a communications network, comprising:
  code for causing a computer to reserve a common connection for use by an access terminal (AT) while deleting one or more AT-specific contexts associated with the AT when the AT is not in an active call or data connection, wherein the AT is one of a plurality of ATs reserving the common connection, wherein the common connection is an A10 connection established between an access node (AN) and a packet data switching node (PDSN), wherein the common connection includes a common mobile Internet Protocol (MIP) tunnel established between the PDSN and an Internet Protocol (IP) network-side element, and wherein the IP network-side element is one of a home agent (HA), a local mobility anchor (LMA), or a call originator gateway component;
  code for causing the computer to associate the common connection with a network identifier corresponding to the AT for reaching the AT, wherein the associating is performed based on a registration session by the AT; and
  code for causing the computer to transmit a message, based on a call to the AT, via the common connection and based on the network identifier, wherein a specific connection and a context for the network identifier corresponding to the AT for carrying the call are established based on a response to the message.

* * * * *